(12) United States Patent
Kephart et al.

(10) Patent No.: US 8,782,201 B2
(45) Date of Patent: *Jul. 15, 2014

(54) SYSTEM AND METHOD FOR MANAGING THE CONFIGURATION OF RESOURCES IN AN ENTERPRISE

(75) Inventors: Aaron D. Kephart, Charlotte, NC (US); Brian R. Kilpatrick, Walnut Creek, CA (US); Wallace A. Kirkland, Aiken, SC (US); William N. Waldron, Allen, TX (US); Michael L. Ritchie, Charlotte, NC (US); Robert J. Maloney, Weddington, NC (US); Atilio A. Deambrosi, Greenville, SC (US); Philip H. Howard-Knight, Purley (GB); Carol Gatrell, Duncanville, TX (US)

(73) Assignee: Bank of America Corporation, Charlotte, NC (US)

( * ) Notice: Subject to any disclaimer, the term of this patent is extended or adjusted under 35 U.S.C. 154(b) by 1142 days.

This patent is subject to a terminal disclaimer.

(21) Appl. No.: 11/163,737

(22) Filed: Oct. 28, 2005

(65) Prior Publication Data
US 2007/0100892 A1    May 3, 2007

(51) Int. Cl.
G06F 15/16    (2006.01)
(52) U.S. Cl.
USPC .............. 709/224; 705/7.28; 726/22; 726/23; 726/24; 726/25; 713/100; 709/223; 709/225
(58) Field of Classification Search
USPC .......... 709/223, 224, 225; 705/7.28; 713/100; 726/22, 23, 24, 25
See application file for complete search history.

(56) References Cited

U.S. PATENT DOCUMENTS

| | | | | | |
|---|---|---|---|---|---|
| 4,864,492 | A | * | 9/1989 | Blakely-Fogel et al. | 706/45 |
| 5,414,843 | A | * | 5/1995 | Nakamura et al. | 707/104.1 |
| 5,655,081 | A | * | 8/1997 | Bonnell et al. | 709/202 |
| 5,680,530 | A | * | 10/1997 | Selfridge et al. | 345/440 |
| 5,774,689 | A | * | 6/1998 | Curtis et al. | 703/21 |
| 5,812,529 | A | * | 9/1998 | Czarnik et al. | 370/245 |
| 5,848,394 | A | * | 12/1998 | D'Arrigo et al. | 705/8 |
| 5,897,635 | A | * | 4/1999 | Torres et al. | 1/1 |
| 5,920,618 | A | * | 7/1999 | Fleischer et al. | 379/221.09 |
| 5,953,526 | A | * | 9/1999 | Day et al. | 717/108 |
| 5,966,434 | A | * | 10/1999 | Schafer et al. | 379/201.01 |
| 5,999,610 | A | * | 12/1999 | Lin et al. | 379/207.02 |
| 6,052,724 | A | * | 4/2000 | Willie et al. | 709/223 |
| 6,081,806 | A | * | 6/2000 | Chang et al. | 707/8 |
| 6,128,016 | A | * | 10/2000 | Coelho et al. | 715/808 |

(Continued)

*Primary Examiner* — Tamara T Kyle
*Assistant Examiner* — Anthony Fabbri
(74) *Attorney, Agent, or Firm* — Michael A. Springs; Moore & Van Allen PLLC; Jeffrey R. Gray

(57) ABSTRACT

System and method for managing the configuration of resources in an enterprise. Embodiments of the present invention gather, store, and maintain institutional knowledge of configurations of IT resources of an enterprise. A configuration database serves as a temporal record of the configurations of the resources. The configuration database can reflect a dimensional model of the enterprise configuration where various configuration items are linked together. A configuration change can be analyzed and approved, and then reflected in a change to a configuration item (CI) which imposes an appropriate change to other configuration items based on upstream, downstream, peer relationships and/or views. A system according to an embodiment of the invention can also include a change database, an inventory database, a problem database, and/or a service level management subsystem to ensure changes to an enterprise's configuration are consistent with service level agreements and/or operating level agreements.

40 Claims, 19 Drawing Sheets

(56) References Cited

U.S. PATENT DOCUMENTS

| | | | |
|---|---|---|---|
| 6,141,681 A * | 10/2000 | Kyle | 709/206 |
| 6,163,859 A * | 12/2000 | Lee et al. | 714/38 |
| 6,170,010 B1 * | 1/2001 | Hirata et al. | 709/223 |
| 6,208,345 B1 * | 3/2001 | Sheard et al. | 715/853 |
| 6,216,135 B1 * | 4/2001 | Brodersen et al. | 707/201 |
| 6,219,701 B1 * | 4/2001 | Hirata et al. | 709/223 |
| 6,389,426 B1 * | 5/2002 | Turnbull et al. | 707/102 |
| 6,438,563 B1 * | 8/2002 | Kawagoe | 707/201 |
| 6,480,901 B1 * | 11/2002 | Weber et al. | 709/246 |
| 6,484,203 B1 * | 11/2002 | Porras et al. | 709/224 |
| 6,529,784 B1 * | 3/2003 | Cantos et al. | 700/79 |
| 6,637,020 B1 * | 10/2003 | Hammond | 717/107 |
| 6,694,337 B1 * | 2/2004 | King et al. | 707/201 |
| 6,701,359 B1 * | 3/2004 | Calabrez et al. | 709/223 |
| 6,748,379 B2 * | 6/2004 | Martin, Jr. | 707/7 |
| 6,772,204 B1 * | 8/2004 | Hansen | 709/220 |
| 6,792,605 B1 * | 9/2004 | Roberts et al. | 719/313 |
| 6,810,419 B1 * | 10/2004 | Bogler et al. | 709/224 |
| 6,832,241 B2 * | 12/2004 | Tracton et al. | 709/203 |
| 6,889,196 B1 * | 5/2005 | Clark | 705/7.12 |
| 6,891,802 B1 * | 5/2005 | Hubbard | 370/241 |
| 6,938,027 B1 * | 8/2005 | Barritz et al. | 706/50 |
| 6,947,063 B1 * | 9/2005 | Cirulli et al. | 715/851 |
| 6,990,459 B2 * | 1/2006 | Schneider | 705/7.28 |
| 7,047,088 B2 * | 5/2006 | Nakamura et al. | 700/19 |
| 7,075,874 B2 * | 7/2006 | Rushton et al. | 369/53.21 |
| 7,107,339 B1 * | 9/2006 | Wolters | 709/224 |
| 7,143,153 B1 * | 11/2006 | Black et al. | 709/223 |
| 7,254,750 B1 * | 8/2007 | Okun et al. | 714/47.2 |
| 7,260,551 B2 * | 8/2007 | Phillips | 705/7.28 |
| 7,313,822 B2 * | 12/2007 | Ben-Itzhak | 726/24 |
| 7,324,954 B2 * | 1/2008 | Calderaro et al. | 705/7.28 |
| 7,373,666 B2 * | 5/2008 | Kaler et al. | 726/23 |
| 7,424,440 B1 * | 9/2008 | Gupta et al. | 705/7.28 |
| 7,433,935 B1 * | 10/2008 | Obert | 709/219 |
| 7,530,105 B2 * | 5/2009 | Gilbert et al. | 726/22 |
| 7,590,554 B2 * | 9/2009 | Chen et al. | 705/7.28 |
| 7,660,707 B2 * | 2/2010 | Maruyama et al. | 703/2 |
| 7,693,945 B1 * | 4/2010 | Dulitz et al. | 709/206 |
| 7,707,637 B2 * | 4/2010 | Kaler et al. | 726/25 |
| 8,185,428 B1 * | 5/2012 | Campo et al. | 705/7.25 |
| 8,239,498 B2 * | 8/2012 | Kilpatrick et al. | 709/220 |
| 8,301,487 B2 * | 10/2012 | Rapperport et al. | 705/7.35 |
| 8,561,167 B2 * | 10/2013 | Alperovitch et al. | 726/13 |
| 2001/0054097 A1 * | 12/2001 | Chafe | 709/224 |
| 2002/0019864 A1 * | 2/2002 | Mayer | 709/223 |
| 2002/0055996 A1 * | 5/2002 | Sugauchi et al. | 709/223 |
| 2002/0087368 A1 * | 7/2002 | Jin et al. | 705/7 |
| 2002/0133385 A1 * | 9/2002 | Fox et al. | 705/7 |
| 2002/0138321 A1 * | 9/2002 | Yuan et al. | 705/8 |
| 2002/0138762 A1 * | 9/2002 | Horne | 713/201 |
| 2003/0004777 A1 * | 1/2003 | Phillips | 705/10 |
| 2003/0016609 A1 * | 1/2003 | Rushton et al. | 369/53.2 |
| 2003/0028606 A1 * | 2/2003 | Koopmans et al. | 709/206 |
| 2003/0041139 A1 * | 2/2003 | Beadles et al. | 709/223 |
| 2003/0079007 A1 * | 4/2003 | Merkin | 709/223 |
| 2003/0093514 A1 * | 5/2003 | Valdes et al. | 709/224 |
| 2003/0105761 A1 * | 6/2003 | Lagerman | 707/10 |
| 2004/0078105 A1 * | 4/2004 | Moon et al. | 700/100 |
| 2004/0078777 A1 * | 4/2004 | Bahrami | 717/105 |
| 2004/0095237 A1 * | 5/2004 | Chen et al. | 340/506 |
| 2004/0103339 A1 * | 5/2004 | Chalasani et al. | 714/4 |
| 2004/0111284 A1 * | 6/2004 | Uijttenbroek | 705/1 |
| 2004/0213220 A1 * | 10/2004 | Davis | 370/389 |
| 2004/0260718 A1 * | 12/2004 | Fedorov | 707/102 |
| 2005/0015667 A1 * | 1/2005 | Aaron | 714/25 |
| 2005/0096948 A1 * | 5/2005 | Chen et al. | 705/7 |
| 2005/0096950 A1 * | 5/2005 | Caplan et al. | 705/7 |
| 2005/0182832 A1 * | 8/2005 | Chen | 709/223 |
| 2006/0242684 A1 * | 10/2006 | Russell et al. | 726/1 |
| 2007/0100712 A1 * | 5/2007 | Kilpatrick et al. | 705/29 |
| 2007/0100892 A1 * | 5/2007 | Kephart et al. | 707/200 |
| 2007/0180522 A1 * | 8/2007 | Bagnall | 726/22 |
| 2008/0072277 A1 * | 3/2008 | Cohen et al. | 726/1 |
| 2008/0133725 A1 * | 6/2008 | Shaouy | 709/223 |
| 2008/0262890 A1 * | 10/2008 | Korupolu et al. | 705/8 |
| 2009/0292586 A1 * | 11/2009 | Rasheed | 705/10 |
| 2010/0023866 A1 * | 1/2010 | Peck et al. | 715/735 |

* cited by examiner

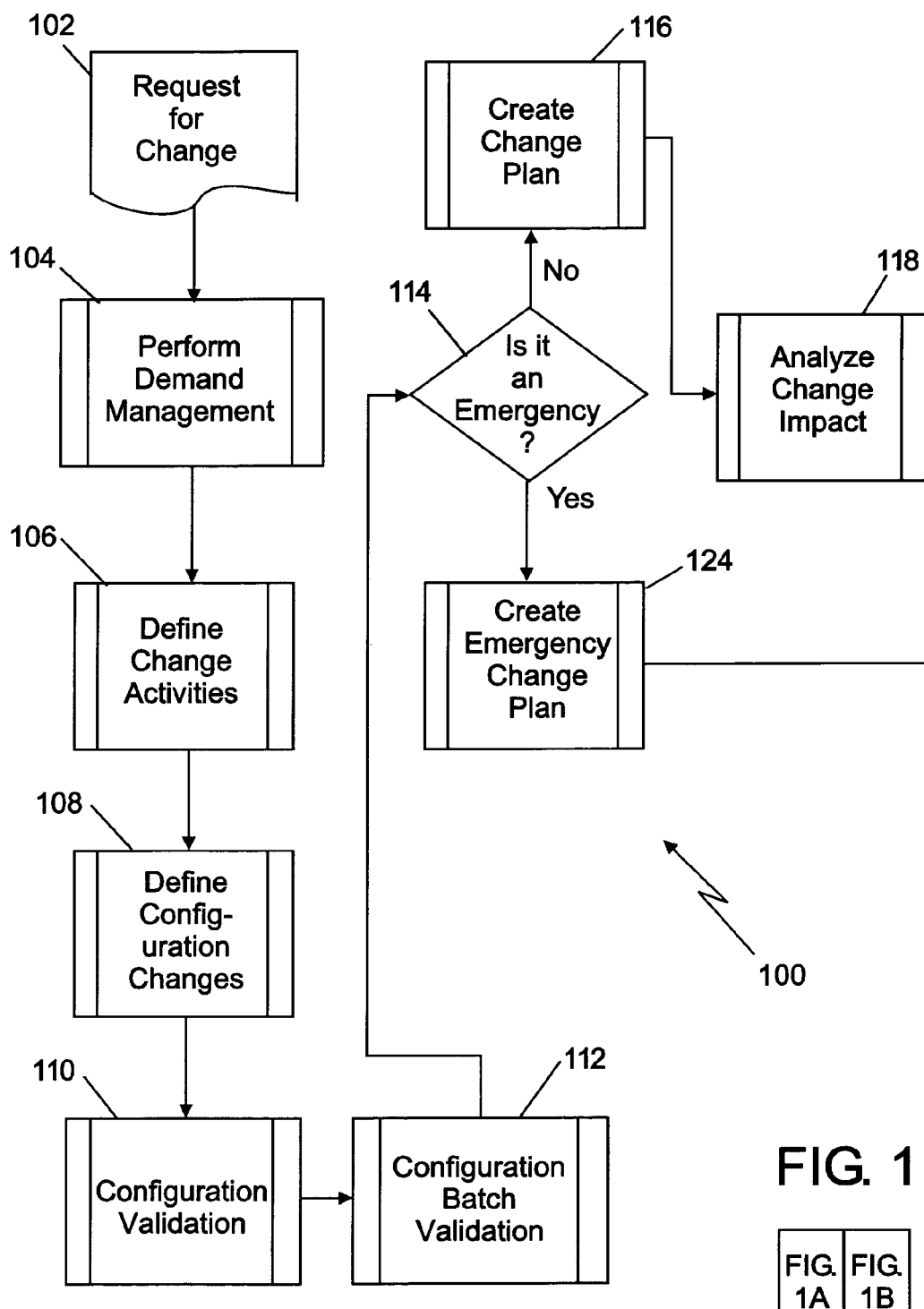
FIG. 1A
FIG. 1

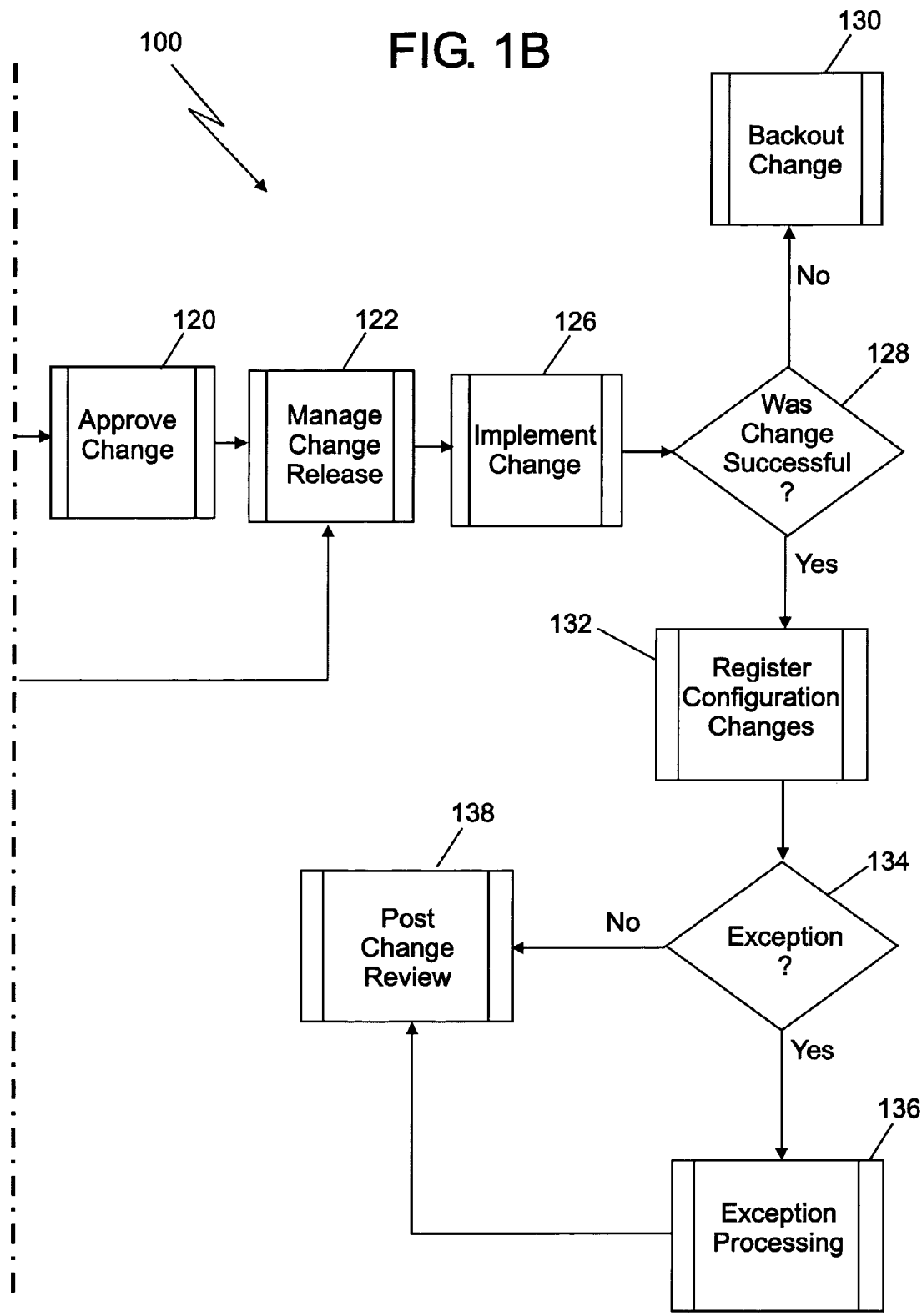

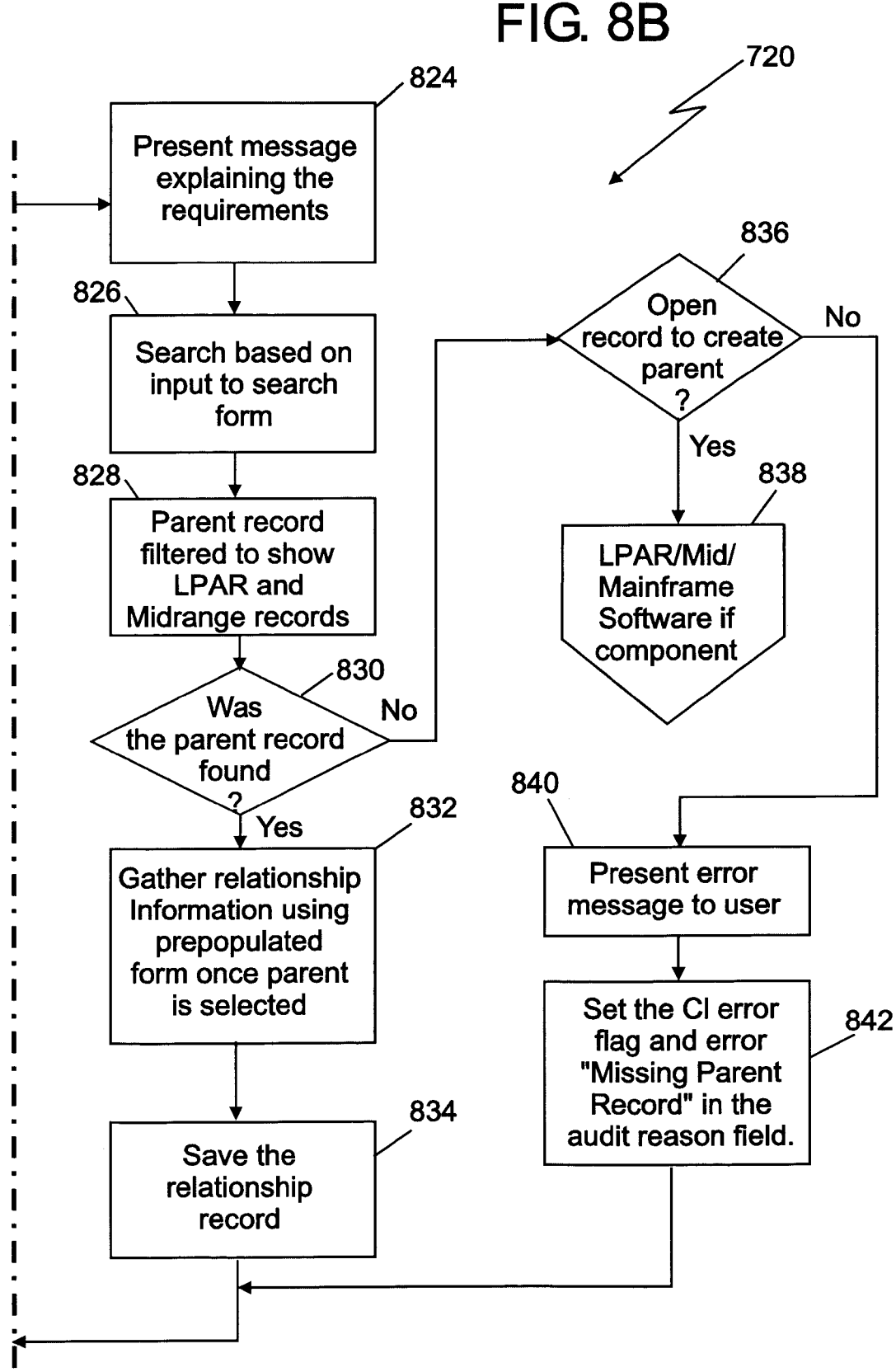

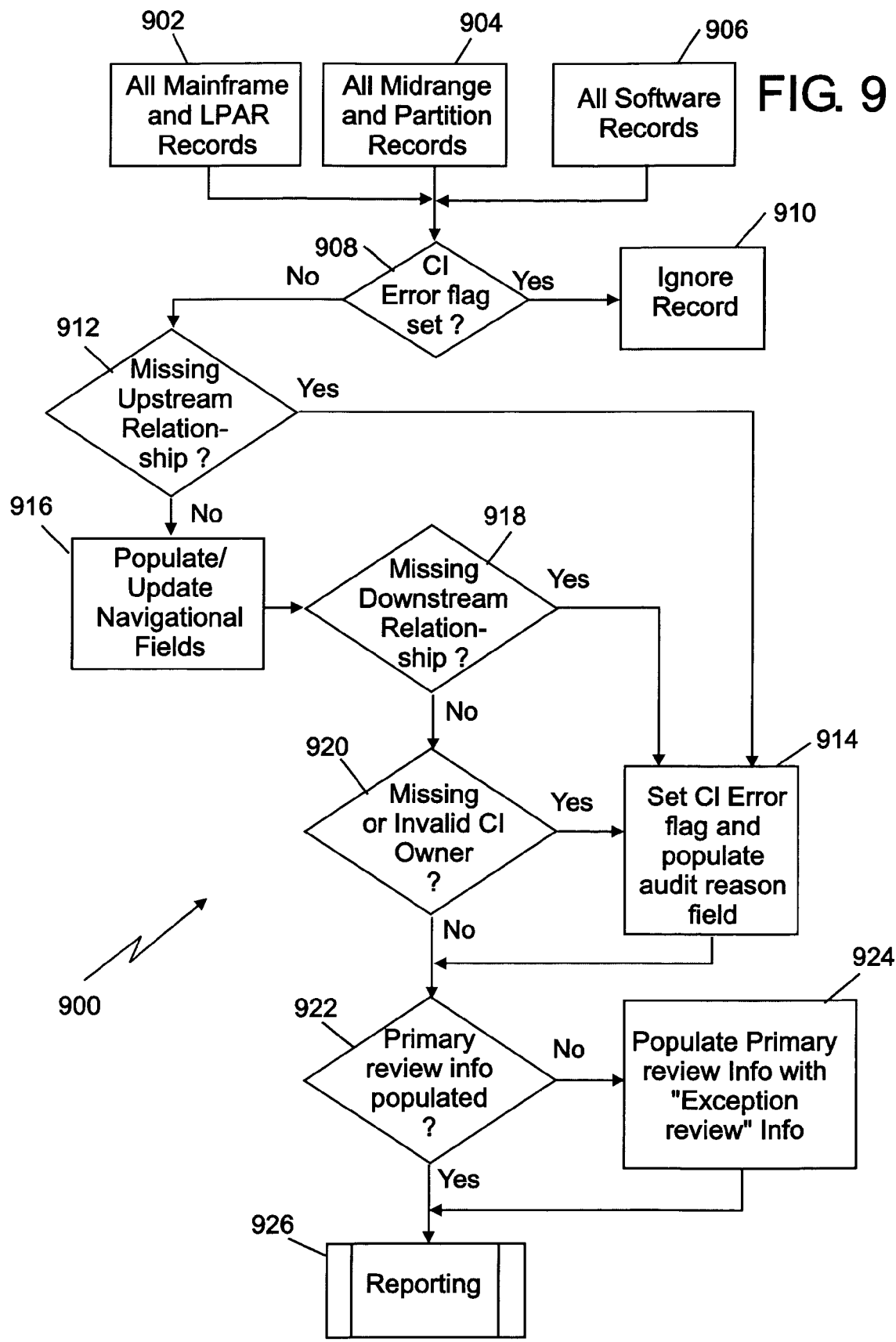

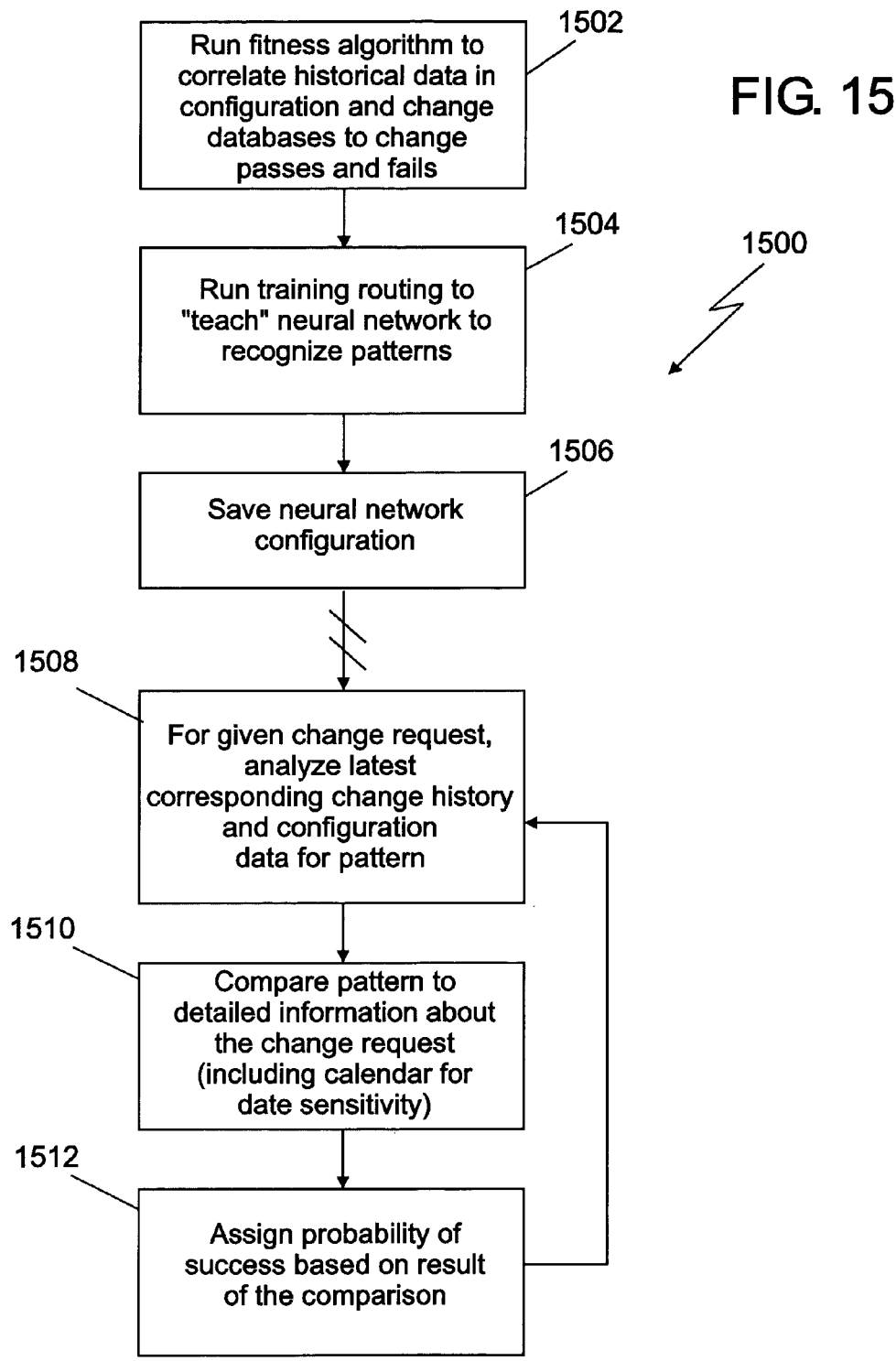

SYSTEM AND METHOD FOR MANAGING THE CONFIGURATION OF RESOURCES IN AN ENTERPRISE

CROSS-REFERENCE TO RELATED APPLICATIONS

Much of what is disclosed in this application is also disclosed in co-pending, commonly owned application Ser. No. 11/163,738, entitled "System and Method for Facilitating the Implementation of Changes to the Configuration of Resources in an Enterprise," filed Oct. 28, 2005, the entire disclosure of which is incorporated herein by reference.

BACKGROUND

As large enterprises have acquired more and more diverse information technology (IT) resources, dealing with the large numbers fluid resources has become both technically and administratively cumbersome. Thus, a premium has been placed on effectively documenting and managing an enterprise's configuration over time. The value of a process or system that enables well-executed and planned changes to an enterprise's IT resources goes beyond the value of the organization's investment in hardware, personnel, and software. How efficiently changes and updates are carried out has a direct bearing on the quality of IT services provided to an enterprise.

Identifying, controlling, and reporting on the configuration of IT resources in an enterprise is essential to the continuity of business operations. Across industry today, the configuration of the IT resources in an enterprise is often managed with labor intensive and relatively inaccurate processes that involve searching through text-based records in databases. In at least some cases, multiple types of information about current, past, and planned IT resource configurations must be gathered from disparate databases, and in some cases past states of the system are not even documented, making it difficult to predict the impact of planned changes.

SUMMARY

Embodiments of the present invention gather, store, and maintain institutional knowledge of configurations of IT resources of an enterprise over time. Through use of an embodiment of the invention, integrated process automation manages IT resources across an enterprise with the aid of various processes and routines, as well as a central repository for configuration information. For purposes of this disclosure, the central repository is referred to as a configuration database, or a configuration management database. This configuration database serves as a temporal record of the configuration of the resources of the enterprise.

In at least some embodiments, a method of managing a configuration of resources in an enterprise includes defining configuration changes based at least in part on previously stored data contained in the configuration database. The configuration database includes a plurality of configuration items describing the configuration of the resources in the enterprise. Configuration changes are proposed, evaluated, and then released subject to an analysis of an impact of the configuration change and to an approval or approvals from within the enterprise. Each new change is registered in the configuration database so that the plurality of configuration items in the configuration database maintains currency and can be used to define future configuration changes.

The configuration database according to embodiments of the present invention is made up of multiple configuration items. Each configuration change is defined in terms of at least one new, updated, or deleted configuration item (CI). Each CI related to a change is validated with respect to links to one or a combination of upstream CI's, downstream CI's, peer CI's or views within the configuration database. In effect, the database is a data structure representing a dimensional model of the enterprise configuration, wherein an array of configuration items is arranged so that at least some of the configuration items are linked together through upstream relationships, downstream relationships, peer relationships and/or views so that a configuration change related to a configuration item (CI) imposes an appropriate change to other configuration items based on the relationships. Different types of configuration items are available for different types of IT assets. For example, each CI in the configuration database might be one of the following types: a midrange computer CI; a midrange partition CI; a mainframe computer CI; a logical partition (LPAR) CI; a software CI; or a software component CI. In some embodiments, the dimensional model is a multi-dimensional stack model, in which relationships can be in part defined by a service view and supporting views. In some embodiments of such a model, a configuration item can be a service CI, a delivery channel CI, an application CI, a sub-system CI, a hardware CI, or a physical location CI.

A system for implementing configuration management according to embodiments of the invention can include a plurality of computing platforms executing appropriate computer program products and maintaining the necessary databases. In addition to the configuration database, a change database or change management database can be operably connected into the system to maintain records of pending configuration changes in support of updating the configuration database. An inventory database can be included to provide updates to the configuration database to maintain currency based on procurement and inventory records. The system can also include a problem database and/or an exception processing database to track problems with configuration changes for analysis and management, and a service level management subsystem to ensure changes to the configuration database are consistent with service level agreements and/or operating level agreements.

BRIEF DESCRIPTION OF THE DRAWINGS

FIG. 1 is a flowchart describing the overall process of a system according to example embodiments of the invention. FIG. 1 is presented as FIG. 1A and FIG. 1B for clarity.

FIGS. 7-11 are flowcharts that illustrate various processes used to manage changes and configuration items in the configuration database according to example embodiments of the invention. FIG. 8 is presented as FIG. 8A and FIG. 8B

FIGS. 13-15 are flowcharts illustrating embodiments of processes used to assess the risk and impact of changes as part of a change management process used in a system according to example embodiments of the invention.

DETAILED DESCRIPTION

Figure 2:
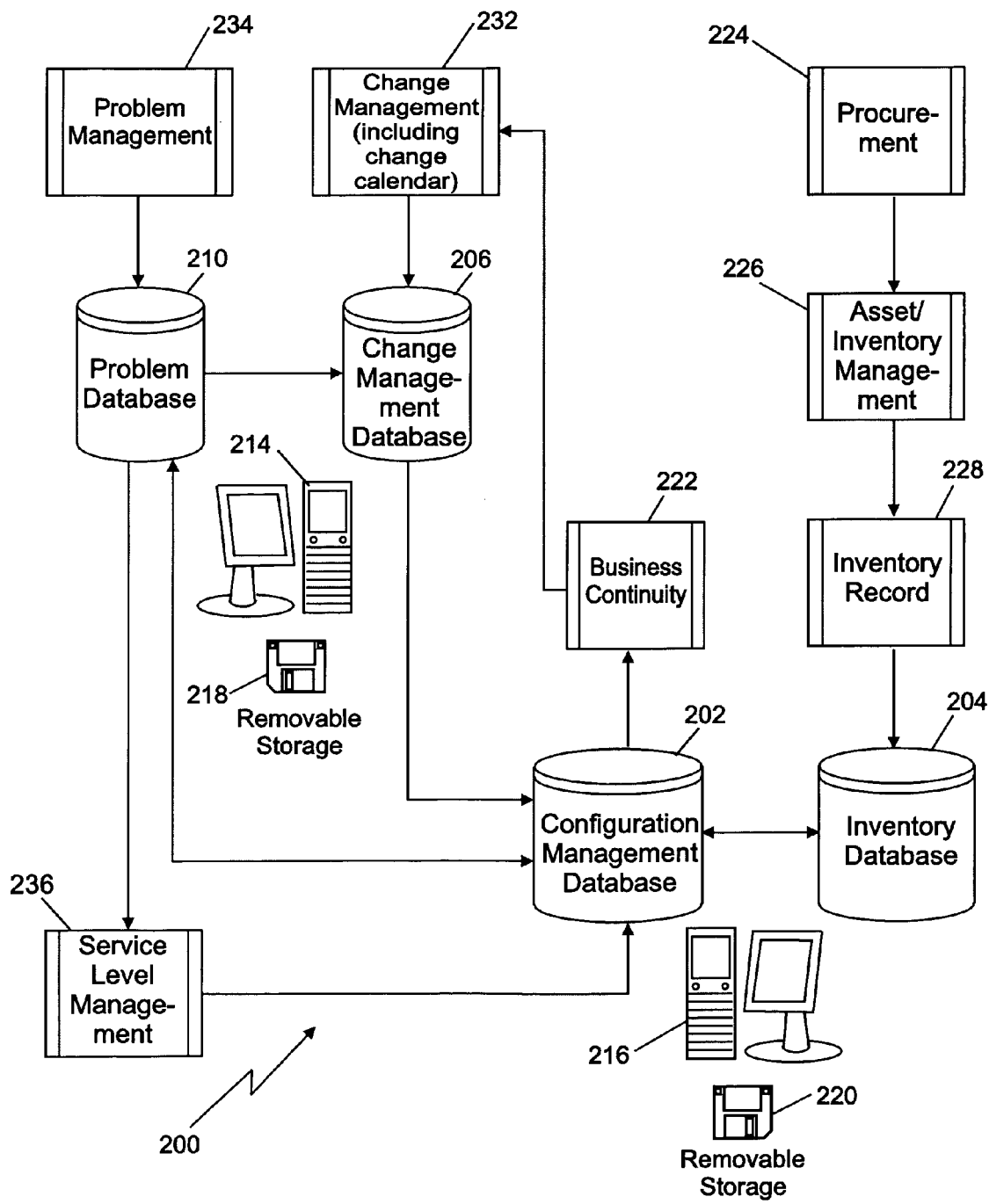
FIG. 2 is a high-level system block diagram for example embodiments of the invention.

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, steps, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

The invention disclosed herein is embodied in an example system in which configuration management and related processes are fully integrated with change management processes. This integration allows a fully automated enterprise infrastructure view of changes as well as a temporal view of scheduled changes locally or enterprise wide. Changes are not documented as text descriptions of a technical change but rather data structure elements reflecting the exact technical attribute of the asset being changed. As changes are executed a configuration database is automatically updated. The reader of this description may find it helpful to initially have an overview of the nature and capabilities of a system according to example embodiments of the invention.

The system according to embodiments of the invention includes a configuration database, which serves as a temporal database. The configuration database may also be referred to herein as a configuration management database (CMDB). The database can include the current state of configuration for all IT assets in an enterprise, as well as the pending or future state and the historic states. The system can be implemented so that a user can select any date past, present or future and examine the configuration of any or all IT assets for the given point in time. This information enables proactive management of configuration changes in the future. Changes can be tentatively scheduled in advance and the pending changes can be taken into consideration when planning any near term changes resulting in a reduced number of change collisions and more coordinated change planning. This capability can also enable the ability to "roll back" or "back out" an IT asset or group of assets to a state prior to a failure by selecting a date prior to a failure and utilizing the configuration of the previous state vs. current state to determine what configuration changes need to be made to return the IT assets to a working state.

The system according to example embodiments of the invention includes the ability to perform batch validation and updates of attributes and relationships. The batch process can examine CI records and identify key attributes that are missing and populate them with the correct data. The batch process can also examine CI records for missing CI relationships between records and missing or inaccurate attributes. Records with errors can be flagged, date stamped and a description of the error can be populated into an audit field. Any configuration management policy of the enterprise that can be expressed as a rule can be enforced automatically using the batch process. This capability can be used to automatically ensure that a minimum level accuracy of the configuration database is maintained. This form of batch validation and updating will be described in detail later with respect to FIG. 9.

Together both the configuration and change management processes and systems have automated controls to enforce configuration policies and standards. As a change request is opened to update or add a configuration item the requestor can be prompted by the system to document the updates in accordance with policies by describing required relationships, populating required fields etc. The system can be set up to also automatically update fields of a CI record. Change requests are specified by pulling accurate, stored information from the configuration database, rather than populating fields with text descriptions authored by the requester. In addition, configuration records can be flagged as standards. Once a record has been flagged as a standard it's added to a list of standards that is available to users of the system. Users can then select an identified standard and apply it to a single configuration record or a group of records. Once this standard is selected, changes can be requested against the standard rather than the individual configuration records. Such requests will automatically generate the required change requests to apply the changes to all configuration records governed by that standard.

With a system according to example embodiments of the invention, software changes can be automatically scheduled, analyzed, approved and deployed. The system can be linked to off-the-shelf software code repositories. Software stored in a repository can be selected for distribution to destination servers registered in the configuration database. Once the change is scheduled, if it meets the appropriate risk and impact criteria the change will automatically be approved systematically. A master change calendar can also be tied into a sensitivity database that enables enterprise wide or local identification of dates that have historic high risk for change, and these dates can be considered in evaluating the risk and/or impact of a change. Scheduling of changes on these dates can automatically present a warning message to the change requestor and adjust the risk values for the change. In addition to reducing enterprise wide change risk this feature can enable automated enforcement of change freeze period policies. Embodiments of the risk evaluation and automated approval process are described in detail herein with respect to FIGS. 13-15.

In some embodiments of the invention, risk and/or impact can be calculated using system and/or operator assigned weights and factors, and the success history of the organization implementing the change. In other embodiments, a neural network can be applied. If a neural network is used, the system analyzes change history for recognizable patterns that correlate to successful or un-successful changes. It then compares the patterns to change requests that are pending approval. The system can then assign a probability of successful change installation.

A bidirectional interface to an inventory database can be included in a system according to embodiments of the invention. As new IT assets are procured (purchased or re-distributed) information on these resources can be automatically fed into the configuration management database and/or change database in an awaiting receipt status. A new asset's installation and/or deployment can be scheduled utilizing the change process of the system. Once the installation and configuration are completed the updated status can be reflected in the inventory database. With respect to software assets, a software catalog in the inventory database can be updated with the detailed information about that software and the license information. The license pool can be automatically incremented and decremented as needed, helping to ensure that unneeded seats are not purchased. Tracking software licenses with this system not only allows for accurate software license management, but also ties in the operational costs and risk of the software installation through the change process.

The system of embodiments of the invention can also include automated configuration validation and exception processing. The change database can have structure and records that match the configuration database. The change database receives either real time or batch data from a variety of sources. As information from the external sources changes the changes are validated against the data in the configuration database. Any differences in data or relationships are captured via an automated exception process, which can make use of additional databases, such as a problem database. Any previously known errors or errors that will be corrected by changes scheduled for installation are ignored. Any remaining errors will be processed by automatically generating a problem ticket. This problem ticket will enable the root cause analysis of the error and pinpoint issues. Once processed through the problem management process using the problem database, a change request can be opened to either correct the data in the configuration database or to otherwise correct the error, for example, by correcting the IT assets shown in the inventory database.

A system according to embodiments of the invention can include a sub-process to monitor compliance with SLA's (service level agreements) the details of which can be maintained in the configuration database. The change process can be made to manage changes to the SLA's. These SLA's can include information about the required availability and established maintenance windows for key business application and customer facing systems. Through the automated calculation of risk and impact, the impact of scheduled IT changes can be weighed against the associated SLA requirements.

FIG. 1 is a flowchart style diagram showing the overall process of change and configuration management according to example embodiments of the invention. FIG. 1 spans FIG. 1A and FIG. 1B. The activities of process 100 may include input and decision-making by IT personnel. Like most flowcharts, FIG. 1 expresses the process as a series of process blocks. In process 100 of FIG. 1, a request for change, 102 is received by the system. At block 104 a demand management process is carried out. The demand management process includes the receipt, categorization and initial analysis of the change request to determine if a change is needed and/or appropriate and thus should be developed and move further through the process. At block 106, change activities are defined, meaning all the tasks and configuration changes required to describe the configuration changes are set out and the workflow is assigned the appropriate parties to perform the tasks.

Still referring to FIG. 1, at block 108, configuration changes are defined in terms of proposed additions, deletions, or updates to configuration items in the configuration database. This sub-process is described in further detail with respect to FIGS. 7 and 8. An initial configuration validation process occurs at block 110, where all CI changes now in a pending state record are checked for errors. In addition, the accuracy of the current configuration of all records being changed is validated against the configuration database. Additional changes are compared to these pending states to correct any discrepancies discovered. At block 112, all pending changes are finally validated in a batch fashion. Configuration records are reviewed for flagged items that need addressing. Invalid, incomplete or missing CI's, attributes or relationships will cause a CI error flag to be set. Certain attribute fields are automatically updated.

At block 114 of FIG. 1, the sub-processes connected with planning and approving the change begin with a decision at block 114 as to whether proposed changes need to be handled on an emergency basis. If not, process 100 branches to block 116 where a normal change plan is created. This sub-process creates a plan that includes activities needed to produce documentation and information used to actually perform and approve a normal change. At blocks 118 and 120, the impact and risks associated with the change are determined and approvals are gathered based in part on this impacts and risks. The activities of block 118 compare the change design and plan to the existing technical environment, a master change calendar and any dependencies and conflicts that may be encountered. This sub-process takes into consideration all areas of service and all risk and impact evaluations from other sub-processes including, but not limited to, quality assurance. Sub-process 118 includes validation of the configuration items in the configuration database and verifying that there are no resource or scheduling conflicts with other changes in the system.

Sub-process 120 includes all of the tasks necessary for change approval, including a risk and impact analysis conducted within the configuration and change management system itself. An approval process for a change record can include, but is not limited to, reviews by a change approval board, and approval by senior leadership within the enterprise. Risk and impact evaluation will be discussed in detail later with respect to FIGS. 13-15. In some embodiments, a neural network can be used. A neural network can analyze the change history for recognizable patterns relating to successful or un-successful changes, compare the patterns to change requests pending approval, and assign a probability of successful change installation. The assigned probability will be used to either automatically approve changes, or for changes with a high probability of failure, it will trigger additional analysis. Since the effectiveness of neural networks increases over time, failed changes will continue to decrease. The system's ability to catch high-risk changes in advance will also increase.

Still referring to FIG. 1, at block 122 the change release is managed to ensure that change documentation and scheduling are appropriately communicated and/or handed off to implementation and fulfillment groups within the enterprise. Returning briefly to block 114, if an emergency change is needed, processing can branch to the creation of an emergency change plan at block 134, allowing for rapid change deployment and implementation. For an emergency plan in this example embodiment, the analysis and approval sub-processes are bypassed.

At block 126 of FIG. 1 the change is implemented. This sub-process includes monitoring the implementation and installing the change, notifying the stakeholders of appropriate milestones, documenting the change and preparing the turnover documentation needed to implement the change In example embodiments, software changes can be automatically scheduled, analyzed, approved and deployed through the change management system. The system is linked through the configuration management system and its database to software code storage applications. Software stored in an application is selected for distribution to specific servers registered in the configuration database. Once the change is scheduled, and if the change meets the appropriate risk and impact criteria, the change will automatically be approved. Once the change is approved, the system will automatically trigger distribution and installation of the software and in some cases certification.

At decision block 128 of FIG. 1, an evaluation is made to determine whether the change is successful. If not, the change can be backed out at block 130. The sub-process for backing out a change will ensure the CI update is also backed out of the appropriate databases. The change back-out sub-process follows the normal change management process, but additional approvals and/or analysis can be required. If the change was successful at block 128, the configuration changes are registered in the configuration database at block 132. The configuration database system may do follow-up processing to check for duplicates within the inventory database.

Still following the flowchart of FIG. 1 at block 134, processing branches if an exception occurs. For example, an exception might occur if no parent record is found for some CI's. Exceptions might also be declared for other reasons depending on the design of the system. For example, exceptions can be triggered if a record is deleted or otherwise retired, or based on business rules related to approving groups. In the case of an exception, exception processing occurs at block 136. In example embodiments, an automated exception process can include validating the configuration information against other available information sources for accuracy, and generating a problem ticket. When an exception is processed, changes to handle the exception can be tracked using the normal change management process.

Example embodiments of the system can include a post change review as shown at block 138 of FIG. 1. For example, in a post change review, representatives of an approving authority and the stake holders, can meet to review aspects of the change, and conclusions and recommendations can be documented. A quality assurance process can also be invoked to perform a quality functional review, which can also be appropriately documented.

FIG. 2 is a system block diagram that illustrates how some of the databases used with embodiments of the invention interact with each other, and with various sub-processes of the change and configuration management process. System 200 in this embodiment includes the configuration database, 202, inventory database 204, change database, 206, and problem database 210. It should be noted that these databases can be maintained on various computing platforms with appropriate storage. Either other computing platforms or these same computing platforms can also host computer program products that enable all of the various automated or otherwise computer implemented portions of the invention, including the risk and impact analysis algorithms. For example, in FIG. 2, system 200 includes schematically illustrated computing or instruction execution platforms 214 and 216 will carry out the various operations required to support and facilitate processes according to embodiments of the invention, as well as maintain and access the appropriate databases. These computer program instructions may be part of a computer program or multiple computer programs which are supplied as a computer program product. In such a case, the computer program product may take the form of computer readable media that allow computer program instructions to be loaded to implement embodiments of the invention. In the example operating environment of FIG. 2, a computer program product in the form of a medium containing the appropriate computer program instructions is shown as removable storage medium 218 and removable storage medium 220.

Computer programs which implement embodiments of the invention can reside on any medium that can store the program for use by or in connection with any instruction execution system, apparatus, or device. The medium may be for example but not limited to, an electronic, magnetic, optical, electro-magnetic, or semiconductor system or device. Such media include compact disk read only memory (CD-ROM) media, and digital versatile disk read only memory (DVD-ROM) media.

Returning to FIG. 2, business continuity sub-processes 222 refers to configuration database 202 and can include contingency data to provide for smooth transitions as changes are made, disaster recovery plans, and the like. Procurement sub-process 224 directs the asset and inventory management sub-process 226, which in turn provides for inventory record maintenance at block 228. Change management sub-process 232 obtains information from business continuity sub-process, and references and maintains the change database, 206. The change management sub-process maintains and updates the change calendar, in at least some embodiments taking into account sensitivity dates. As previously described, change database 206 is used to update the configuration database. As shown at block 234, problem management sub-processes interact with problem database 210, which assists with documenting the processing of both change records and problem tickets. Problem database 210 also refers to configuration database 202 to provide root cause analysis. Service level management block 236 can be invoked by the problem database system to manage the service level agreement (SLA) and operating level agreement (OLA) relationships documented in configuration database 202.

Since the configuration database of embodiments of the present invention provides the reference data that allows the configuration management and change management processes to function, it will be helpful to the reader to have some detailed understanding of the nature and organization of the configuration database. The configuration database contains a plurality of configuration item (CI) records, also simply called configuration items or "CI's." Each CI record in the configuration database contains its own specific dependencies, attributes, relationships, components, and parameters. Each CI has at least one component, a parameter, or an attribute that can be changed through appropriate processes. In example embodiments of the invention, each CI also has an owner and a configuration owner. It also has a status, which in example embodiments, can include such designations as "in use", "retired", and "inactive." In the example embodiments, any CI that is in use must have at least one relationship. Relationships can be hierarchical or "peer-to-peer." within the configuration database.

As previously mentioned, CI records in example embodiments of the invention have attributes. Each CI has at least one attribute that provides a means of capturing required data describing the CI. Change attributes are used to drive the change process. Navigational attributes are used to provide a means of grouping CI records in order to provide for faster and/or more efficient record retrieval. Attributes can include a wide variety of items. Examples include document links, owners, locations, platforms, software types, partitions, and detailed information about software and hardware assets such as serial numbers and license numbers, etc. Configuration items are also organized into types. Some types can also be subtypes, wherein a specific relationship to another type can be specified.

Figure 3:
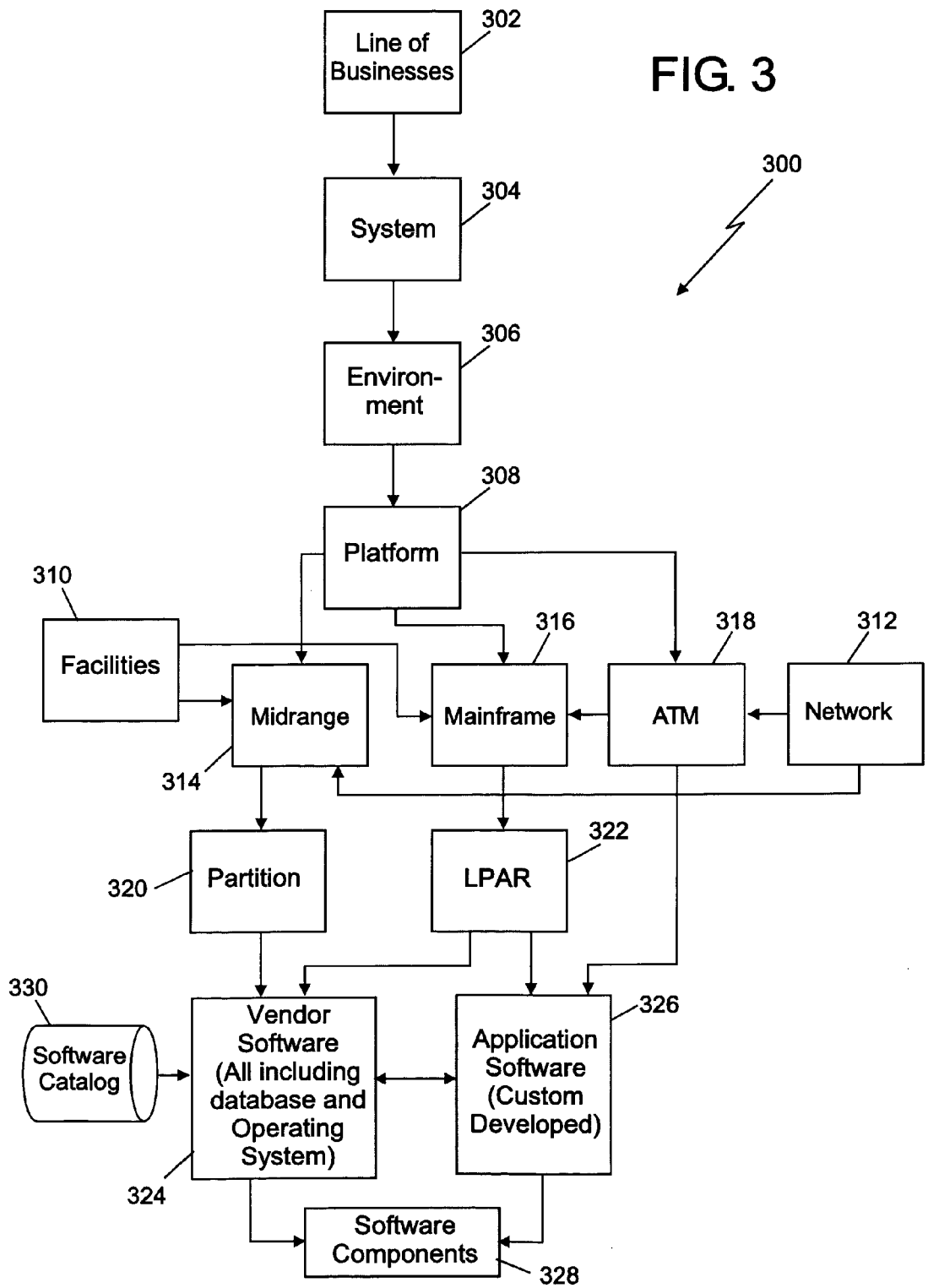
FIG. 3 is a schematic illustration of an embodiment of a data structure that follows a dimensional model of enterprise configuration within a system according to example embodiments of the invention.
Figure 4:
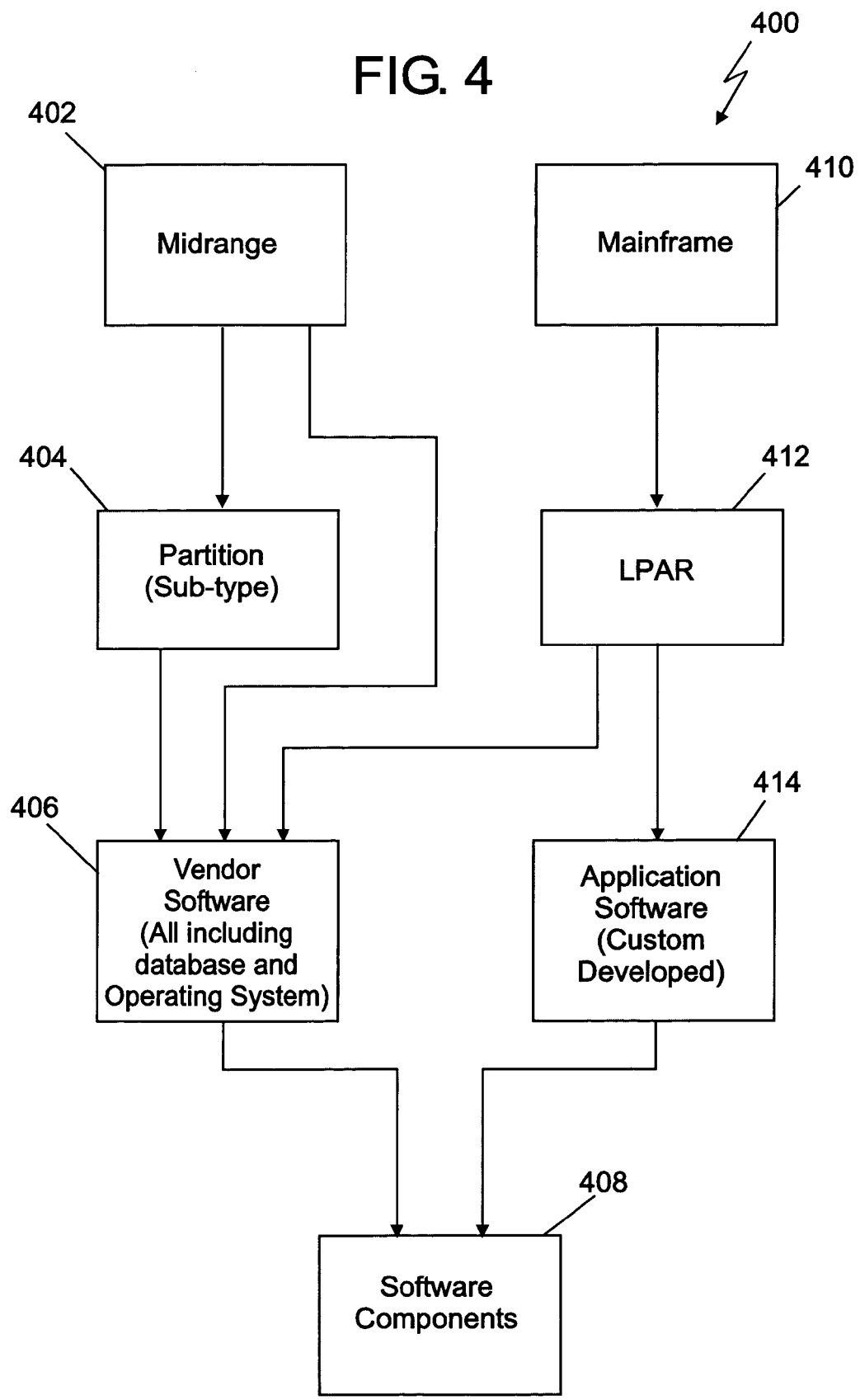
FIG. 4 is a schematic illustration of upstream and downstream relationships that can be documented and enforced in a dimensional model of enterprise configuration according to example embodiments of the invention.

FIGS. 3 and 4 provide conceptual illustrations of example data structures for storing information in the configuration and possibly other databases as used with example embodiments of the invention. For purposes of this disclosure, these types of data structures are referred to as "dimensional models." Data Structure 300 illustrates how configuration item records are organized into various interconnected types. Configuration items can be linked upstream, downstream, or peer-to-peer, as previously described. Line of business CI records, 302, system CI records, 304, environment CI records, 306, and platform CI records, 308, are categorical records, which include configuration items that apply at a very high level across respective organizations. A system CI in this example embodiment is an internally developed application (one not supplied "off-the-shelf" by a software vendor) in combination with infrastructure components that form a system. With the exception of some types of software configuration items, all other configuration items illustrated in FIG. 3 specify records that are shared with asset and/or inventory management. It should be noted that a data structure such as that shown in FIG. 3 can also include documentation configuration items, and process configuration items, such as items which might be in a category related to particular review boards involved in the change process.

Still referring to FIG. 3, facilities configuration items 310 and network configuration items 312 represent types of configuration items that might be distributed across a broad area within the enterprise. Midrange computer CI's and mainframe computer CI's, 314 and 316 respectively, include configuration items related to specific pieces of hardware distributed throughout the enterprise. For purposes of this particular example embodiment, assume that the configuration database in question is being used within a bank or similar financial institution. In that case, automatic teller machine (ATM) configuration items 318 can be included. Other specialized type of hardware can be included according to the needs of the particular type of enterprise implementing an embodiment of the invention. Partition configuration items 320 include the types of partitions that can be organized on a midrange computing system. Similarly, logical partition (LPAR) configuration items 322, are included. It should be noted that the arrows in data structure 300 of FIG. 3 specify relationships which may be process relationships, logical relationships, or physical relationships. These relationships may be upstream, downstream, or peer-to-peer. For example, a partition CI at 320 has an upstream relationship to a midrange computer system, which is grouped with configuration items 314, which can have further upstream relationship to a platform CI's 308. The midrange computer system configuration items in turn can have a peer relationship to facilities configuration items, 310.

Software configuration items can be included in vendor software CI's, 324, custom developed application software configuration items, 326, or can be classified with software components, 328. Information in vendor software configuration items can be populated from a software catalog interface, 330. Thus, the data structure of FIG. 3 can be thought of as an array of configuration items grouped into types or subtypes, wherein upstream, downstream, and peer-to-peer relationships between configuration items are specified by appropriate links.

FIG. 4 provides additional illustrative information on the upstream and downstream affects that configuration items may have in a configuration database according to some example embodiments of the invention. The example in FIG. 4 uses only configuration items with physical relationships omitting all other types of configuration items for purposes of clarity. Thus, FIG. 4 represents a portion of a dimensional model according to embodiments of the present invention. Portion 400 of the dimensional model includes midrange computer system configuration items 402. These have downstream relationships to partition configuration items 404, vendor software configuration items 406, and software component configuration items, 408. Portion 400 of the configuration database also includes mainframe configuration items, 410, logical partition (LPAR) configuration items 412, and custom developed application software configuration items 414. Mainframe CI's 410 have a downstream relationship to LPAR CI's 412, custom developed application software CI's 414, and software component CI's 408. Logical partition CI's 412 also have a downstream relationship to the vendor software CI's, 406.

Still referring to the example of FIG. 4, if a midrange CI does not have a name in common with a group of partitions, it must have at least one downstream relationship to a software CI, but can have many downstream relationships. If it does have a common name for a group of partitions, then the midrange CI must have at least one downstream relationship to a partition CI. A partition CI must have one upstream relationship to a midrange CI. In turn, a partition CI must have at least one downstream relationship to a software CI, but can have many downstream relationships.

In FIG. 4, each mainframe CI from the mainframe configuration items, 410, must have at least one downstream relationship to a logical partition CI. In turn, each logical partition CI must have at least one upstream relationship to a mainframe CI. Logical Partition CI's, 412, must in turn have at least one downstream relationship to a software CI, but can have many such relationships. The software configuration items of FIG. 4, 406, 408, and 414, must all have upstream relationships. The vendor software and custom application software CI's must have upstream relationships to some sort of hardware related CI. A software component CI, 408, must have an upstream relationship to a parent software CI.

Figure 5:
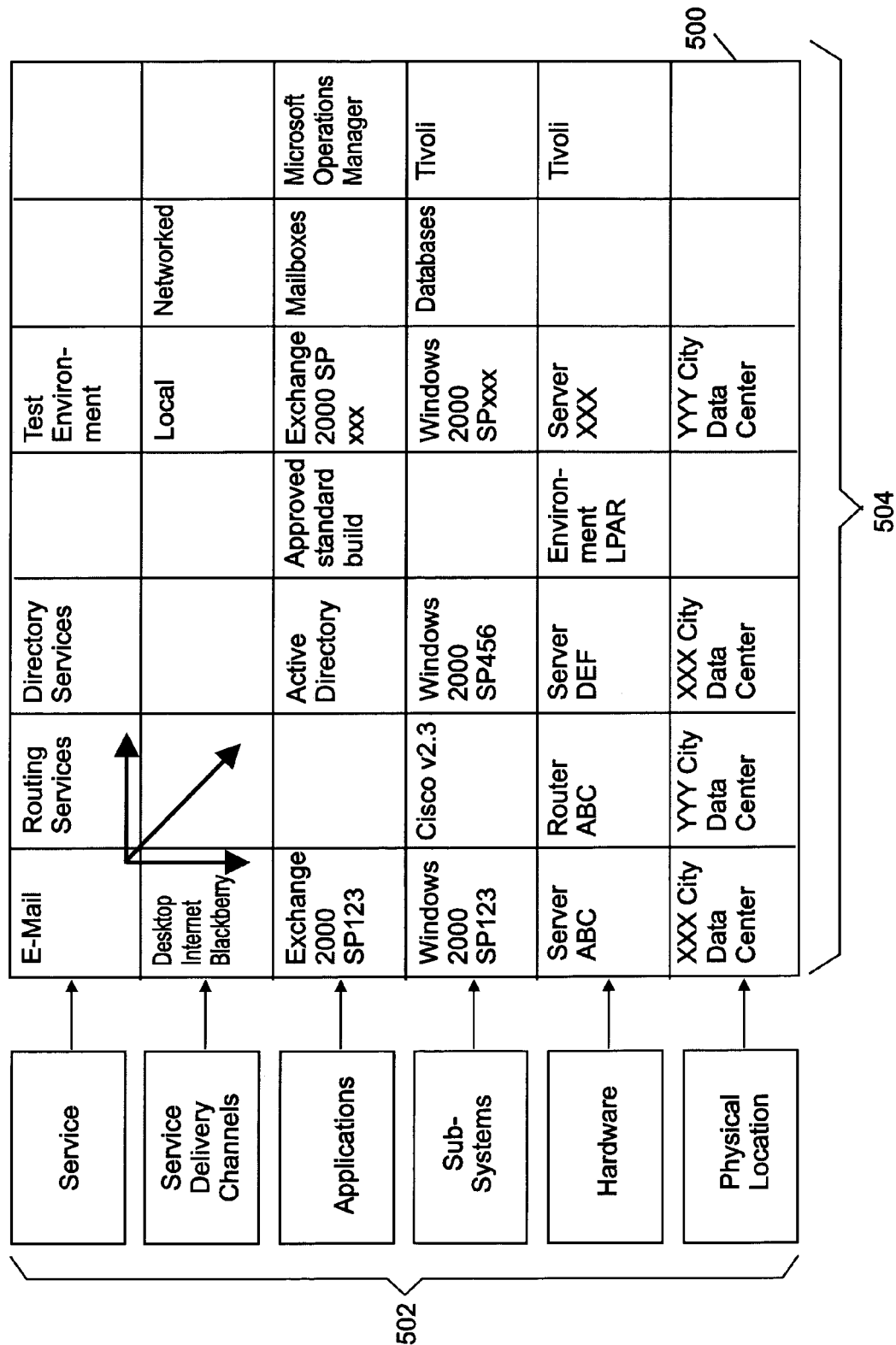
FIG. 5 is a schematic illustration of at least a portion of a data structure that follows a multi-dimensional stack model of enterprise configuration according to some example embodiments of the present invention.

FIG. 5 illustrates another embodiment of a dimensional model for the configuration database. For purposes of this disclosure, the embodiment of FIG. 5 is referred to as a "multi-dimensional stack" model of enterprise configuration. In FIG. 5, grid 500 contains specific configuration items, which can have the same types of upstream and downstream relationships previously described. In addition, however, CI's can be organized into stacks based on a service view of the enterprise configuration. Each CI type within a given stack can have a separate owner and change approval group. Stack 502 illustrates generic CI types, which can describe specific CI's, either alone or in addition to the specific types discussed with respect to the model of FIG. 3. The CI types in this example stack include service CI's, delivery channel CI's, application CI's, sub-system CI's, hardware CI's, and physical location CI's. Supporting service views 504 are mapped horizontally on the grid. The various specific CI's types within the grid are indicated by the legends thereon and are all types that would be well-known to those of skill in the IT arts. The bold arrows on grid 500 indicate, as an example, how E-mail as a service can be mapped onto the data structure.

The model represented by FIG. 5 allows alignment to standard process frameworks, such as those described by the "Information Technology Infrastructure Library"®, a well-known set of standards for IT service management, and the "Capability Maturity Model"® (CMM) for software, a well-known standardized model used to define software processes and assess their maturity.

Supporting service views of the enterprise configuration in FIG. 5 can be customized for the particular enterprise. In at least one example embodiment, examples of supporting service views represented along the horizontal axis of the grid of the model include a network view, a security view, a data view, a development view, a service management view, and an organization view. When looking at the model from a supporting service view, data can be presented so that only the configuration items relevant to that view of the stack are accessed or viewed. To further illustrate, in a network view of the stack, service CI's might include those related to POP, SMTP, HTTP, FTP, DNS, etc. Delivery channel CI's might include those related to a LAN, a WAN, a domain, etc. Application CI's might include those related to TCP, UDP, etc. sub-system CI's might include those related to internet protocol version 4. Hardware CI's might include those related to specific routers, switches and cables, and physical location CI's might include those related to specific data centers.

As another example, consider a security supporting service view of the stack. In a security view, service CI's might include those related to virus protection and directory services. Delivery channel CI's in a security view might include those related to desktop computers, PDA devices, laptop computers, etc. Application CI's in a security view might include configuration items related to anti-virus software, active directory, etc. Subsystem CI's might be those related to a specific server architecture and hardware CI's might include those related to specific servers.

Figure 6:
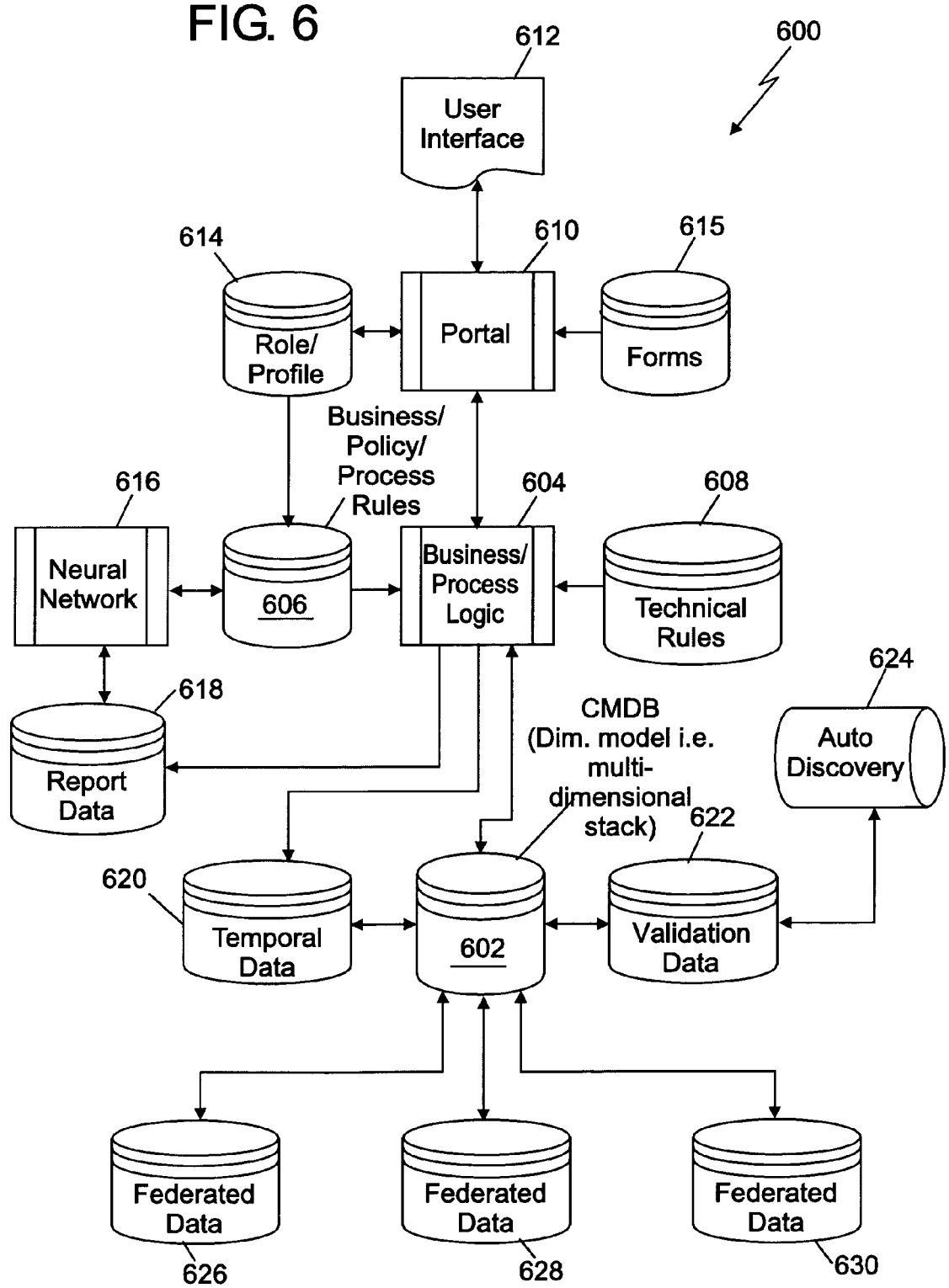
FIG. 6 is a schematic block diagram that illustrates how a configuration database according to example embodiments of the invention can acquire data from various sources throughout an enterprise.

FIG. 6 is a block diagram which illustrates how a configuration database according to embodiments of the invention can poll data from a wide variety of sources within the enterprise. FIG. 6 illustrates a portion, 600, of the infrastructure of an enterprise which is implementing a configuration database, in this example called the configuration management database (CMDB), 602. The CMDB contains configuration data organized along the lines of a dimensional model, which may be in some embodiments, a multi-dimensional stack model. Business process logic 604 can supply data to the configuration database based on information in a business and policy rules database, 606, and a technical rules database, 608. Additionally, information is input through a portal, 610, to which users have access through user interface 612. Portal 610 and business and policy rules database 606 have access to role information in role/profile database 614. The portal also has access to forms database 615. Neural network 616 provides a way to assess the risk of proposed changes to the configuration database, and is discussed in greater detail with respect to FIG. 15. Neural network 616 and business and process logic 604 both have access to stored report data, 618.

Still referring to FIG. 6, configuration database 602 has access to temporal data 620 and validation data 622. The database holding the validation data can make use of an auto discovery process, schematically represented interface 624. Finally, the configuration database can obtain information from federated data stored all over a typical enterprise. This federated data is conceptually represented by databases 626, 628, and 630. The federated data can include data on the employees in the enterprise, financial data about the activities of the enterprise, information about vendors, and process data related to problem tickets, service level management, etc.

Temporal data, as mentioned above, refers to a state in time with respect to a particular resource. For example, a change in the amount of memory installed in server together with the date of that change, past or future is temporal data. The auto-discovery process that is referred to in the embodiments of the invention described herein can be accomplished with and of many standard software tools that are designed to scan server and mainframe computer systems and determine software installed, hardware configuration, network connections, and the like. Such an auto-discover tool can be used to baseline configuration data, to obtain validation data, or both.

Figure 7:
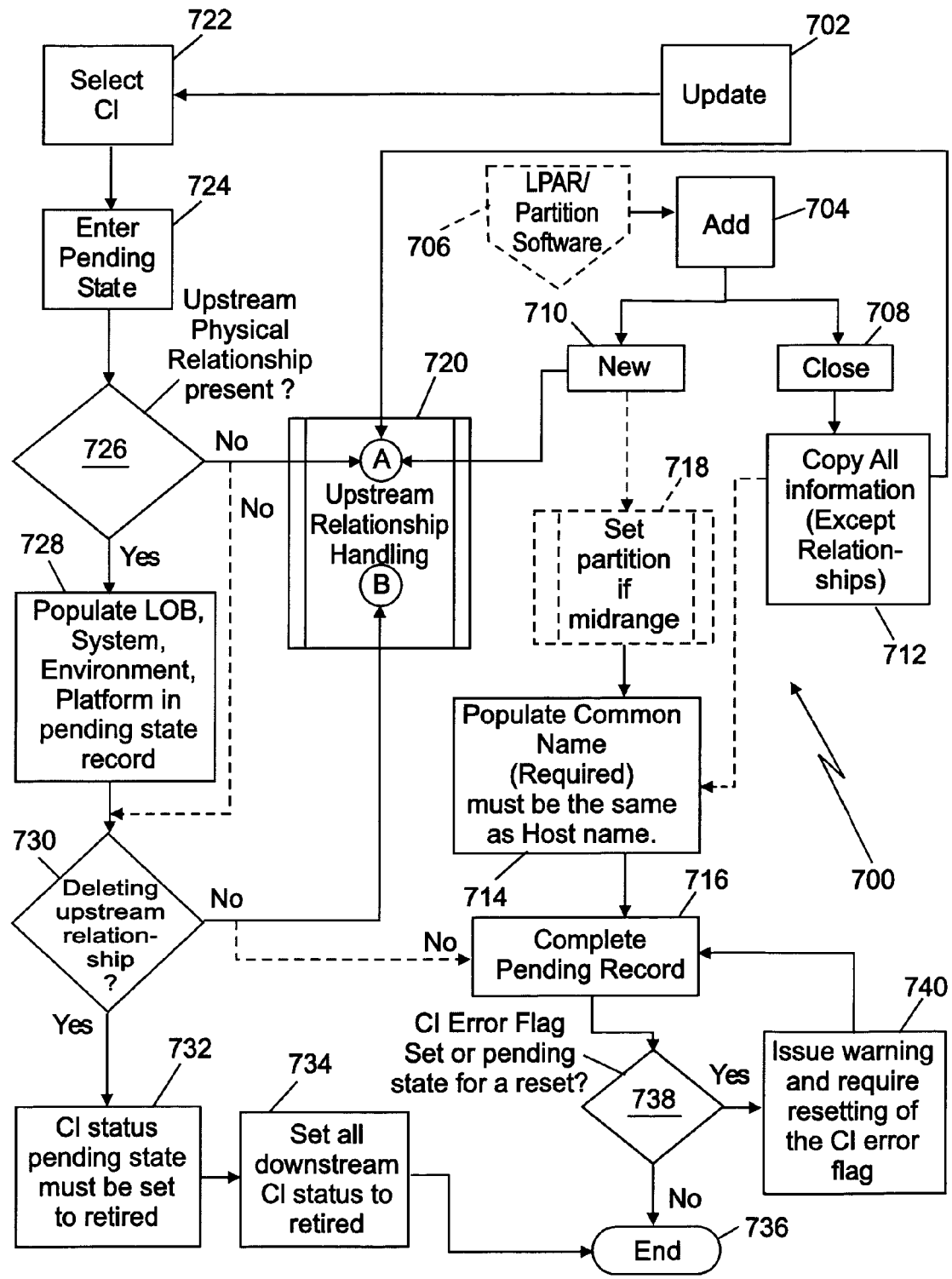
Figures 8, 8A:
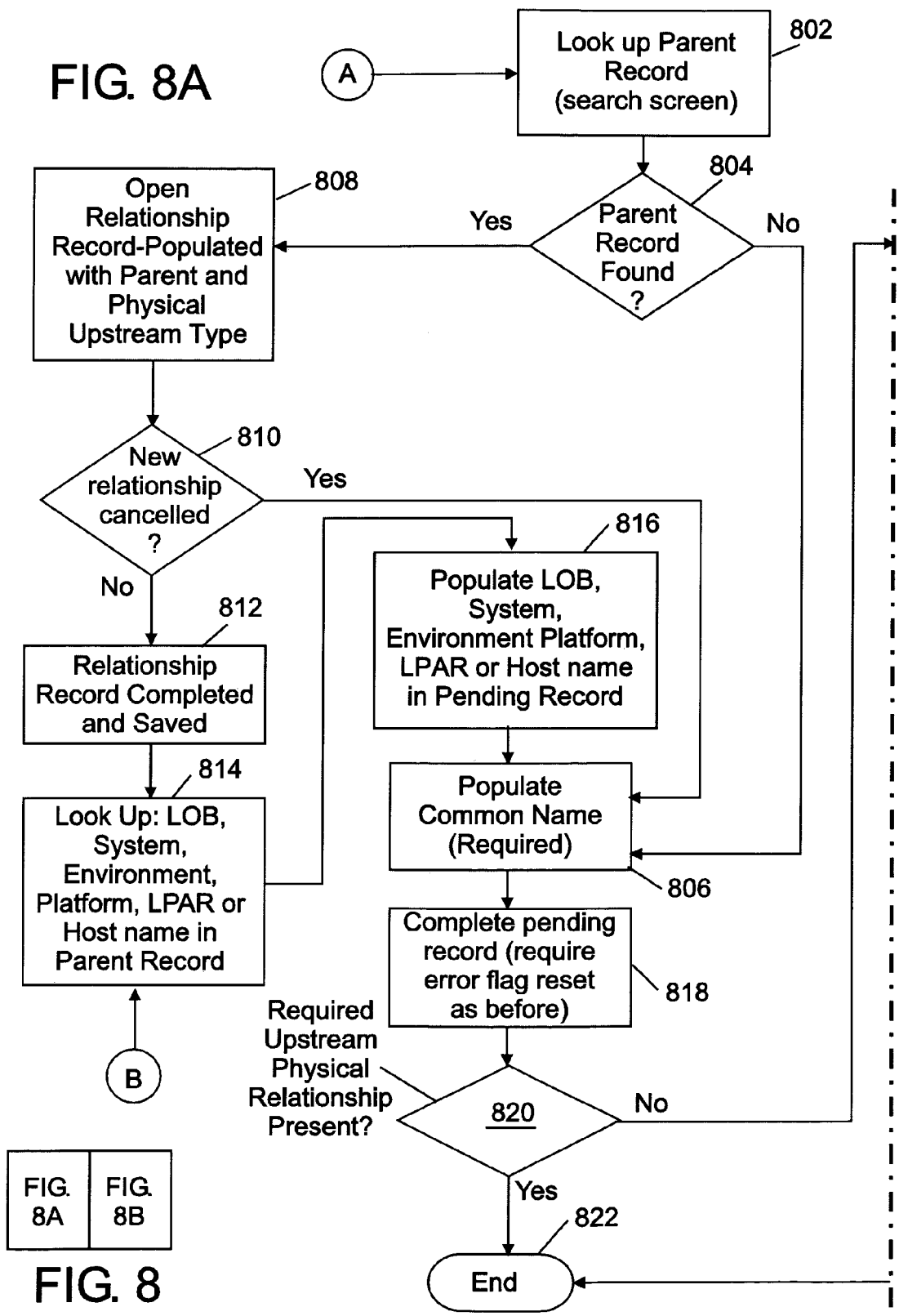

The flowcharts illustrated in FIGS. 7 and 8 describe how changes to an enterprises configuration are defined and described in terms of configuration items which can be stored in the configuration and change databases. These tasks, in example embodiments, are typically performed after a change has been requested by a person, organization, or process within the enterprise. The change request can be first validated to make sure that it is a valid type of request for the enterprise. A preliminary analysis can also be performed to determine if changes can be accomplished within set procedures and business practices. Other activities that could take place prior to actually creating or updating configuration items include the description of the change in terms of its general type, and determining a requestor assigned initial impact and risk value. These impact and risk values can be used in impact and risk calculations to be carried out when the impact of the change is evaluated. Dates for the actual change activities can also be approximated and evaluated, using an established master change calendar, which represents all change activities currently being undertaken in the enterprise. The master change calendar can be maintained as part of the change database. These types of activities can generally be considered demand management as previously discussed with respect to block 104 of FIG. 1.

In addition to the demand management activities described above, a change is defined in terms of the group that will be performing the implementation and the nature and number of tasks that will be needed to actually implement the change. These activities, in example embodiments, generally fall under the rubric of defining the change activities as previously discussed with respect to block 106 of FIG. 1. These activities set the stage for defining the actual configuration changes in terms of updated, deleted, new, or otherwise modified configuration items from the configuration database.

FIG. 7 is a flowchart which illustrates how configuration items can be added or updated according to example embodiments of the invention. Again, process steps or sub-processes are represented as a series of process blocks. In FIG. 7, some paths and sub-processes are shown with dotted lines to illustrate that they are either optional, or may not be present depending on the type of CI being manipulated. Process 700 of FIG. 7 can begin at either block 702, if a CI record is to be updated, or block 704, if a new CI record is to be added. Assuming a CI record is to be added, it could be because a user is initiating a configuration change by adding a specific CI, or the user has been prompted to add an upstream or otherwise linked CI based on another update, for example to an LPAR, partition, or software CI, as shown at block 706. Once a user decides to add a configuration item at block 704, the user can either choose to clone an existing item at block 708 or add a completely new item at block 710. A user might wish to clone an existing record if the new record is similar to an existing record. In that case, a copy function of a tool that is used to access the appropriate databases can help save time when entering attributes for the new CI. In the example of FIG. 7, if a record is cloned, all the information in the cloned record except its relationships to other CI's is copied at block 712. At block 714, additional information can be populated either by a search for parent records or using categorical information if the record is a categorical record. In such a case the pending record can be completed at block 716. If a new record is created at block 710, processing then proceeds to block 718 if the record is a midrange computer CI, in which case the partition for the item is set. Processing then proceeds again to block 714 and block 716 as before. However, in example embodiments, if the new record at block 710 is for anything else, processing proceeds to transfer point A of sub-process 720, which is a sub-process in which upstream relationships are handled as further detailed in FIG. 8. Note that wherever a parent record is sought in order to populate a new CI, the parent record is retrieved from a configuration database that is, for the most part, known to be an accurate representation of the current configuration of the enterprise.

Still referring to FIG. 7, if a choice is made to update an existing CI at block 702, then the appropriate CI is selected at block 722 of process 700. The selected record enters the pending state at block 724. At decision block 726, processing branches depending on whether an upstream physical relationship is present for the selected CI. For non-categorical configuration items, at least one upstream physical relationship is normally required in example embodiments of the invention. This relationship should identify the parent record. If a required upstream physical relationship is present, processing proceeds to block 728, if the CI is a type which would require the upstream information for a line of the business, system, environment, platform, or the like to be populated. Otherwise, processing proceeds to decision block 730. If the upstream physical relationship is not present and not required, processing also branches to decision block 730. However, if an upstream physical relationship is not present but is required, processing again branches to transfer point A of block 720, which denotes the sub-process discussed with respect to FIG. 8.

It should be noted that throughout FIG. 7, whenever a parent record is looked up, a search screen can be presented to the user for this purpose. It should also be noted that an exception process can be implemented if a record is required but cannot be found. In any case, at block 730, processing branches depending on whether an upstream relationship is present and is being deleted. If it is present and not being deleted, processing again branches to sub-process 720, but at transfer point B. However, if it is not being deleted because there was no upstream physical relationship and none was required, processing will instead branch again to block 716 where the pending status of the record will be completed. If an upstream relationship is being deleted at block 730, processing branches to block 732 so that the status of the CI can be set to retired. In that event, downstream configuration items will also have their status set to be retired at block 734, and the process ends at block 736. Finally, at decision block 738, processing branches depending on whether an error flag was set during any of the previous sub-processes. If so, a warning can be issued by the system at block 740 after which the record is maintained in a pending state. If there are no error flags set in the pending record, processing proceeds again to the end of process 700 of FIG. 7 at block 736.

FIG. 8 presents a flowchart that details sub-process 720 from FIG. 7. FIG. 8 is presented as FIG. 8A and FIG. 8B. The transfer points A and B are entry points for sub-process 720 as indicated previously. At block 802 in FIG.8, a parent record can be looked up with a configuration management tool that accesses the database. In example embodiments, this search can be facilitated by a search screen interface as is known in the art. At block 804, processing branches depending on whether or not a parent record was found in the search. If not, an exception can be flagged (not shown) if the record is not a categorical record. Otherwise, common fields are populated from parent record information at block 806. Assuming a parent record is found, processing branches to block 808 where the relationship record is opened and populated with parent information as well as the physical upstream type for the record. A user will have the opportunity in some embodiments to cancel the new relationship at block 810. If the user exercises this option, processing again branches to block 806 where a common name is populated. If not, the relationship record is completed and saved at block 812. At block 814, the appropriate upstream information is retrieved from the database. This information can include a line of business, system, environment, platform, logical partition, or host name. It should be noted that if sub-process 720 of FIG. 8 had been entered from transfer point B of FIG. 7, the looking up of this information would be the initial process block executed in FIG. 8.

Still referring to FIG. 8, the upstream information previously looked up is populated at block 816. Processing then reaches block 806, where the common name for the type of record is populated regardless of which sub-processes have hereto been executed. The pending record is then complete at block 818, possibly with an error flag reset as previously described with respect to FIG. 7. At block 820, a determination is made as to whether a required upstream physical relationship is present in the record. If yes, the entire process ends at block 822. If a required relationship is not present, processing proceeds to block 824 where this requirement can be explained to a user via a display screen.

At block 826 of FIG. 8, a search screen can again be presented collecting input to use in searching for a parent record. At block 828 an appropriate filter is applied, for example limiting the parent records to logical partitions or records related to midrange computing systems. This would be the case for example where software records are being handled. At block 830, processing branches depending on whether a parent record was successfully found. If so, processing proceeds to block 832, where relationship information can be gathered using a pre-populated form. In this case, all key fields are copied from the parent configuration item. The specific fields copied will vary based on the type of CI involved. At block 834, the relationship record is saved, and the process ends again at block 822. If the parent record was not found at block 830 processing branches to block 836. A user can then open a record to create a parent, which causes processing to branch to block 838, where the appropriate configuration item is opened and/or created. A software record could be opened or created at block 838 if the original CI being handled is a software component CI. If the user does not open a record to create a parent at block 836, processing proceeds to block 840, where an error message is presented. At block 842, an error flag is set to indicate a missing parent record and the process again ends at block 822.

As previously discussed with respect to FIG. 1, configuration changes are validated after all the appropriate configuration item updates, deletions, and additions have been completed. In example embodiments, change request validation can be accomplished in either an individual or a batch fashion. When an individual change request is validated, the system first verifies that all configuration items being changed are listed or otherwise associated with the appropriate change request. If any configuration item entries are missing, a return to the process of defining change activities can be forced. Likewise, if there is an invalid CI listed in the change request, it can be deleted, and the pending state record can be changed in the change database. The pending state record in the change database is examined to verify the status, attributes, and relationships. The overall configuration change can also be checked to verify that the configuration is correct. Appropriate changes to components, parameters, etc. are applied to the database and appropriate CI status changes are also noted.

Configuration batch validation according to at least some embodiments of the invention is illustrated by the flowchart of FIG. 9. In process 900 of FIG. 9, the batch validation and update routine can be set to run automatically at a prescribed interval. These settings can be specified independently in example embodiments of the invention for all mainframe and LPAR records at block 902, all midrange computing system and midrange partition records at block 904, and all software records at block 906. At decision block 908, the batch process checks to see if the CI error flag is set for each record. If so, the record is ignored at block 910. Otherwise, the batch process will check for missing upstream relationships at block 912. Certain CI types processed will require a physical relationship to another record of the appropriate CI type. If the required relationship is missing, processing proceeds to block 914 where the error flag for the particular record is set and an audit field is populated. Otherwise, navigational fields are populated for the record at block 916. Navigational fields are used to categorize CI records so they can be easily located. These fields also mirror the hierarchical relationship between CI records. As changes are made to a configuration item's upstream or parent CI record, the values in the fields corresponding to the upstream configuration items need to be updated. Batch process 900 of FIG. 9 will copy information from select navigational fields of the record upstream and populate that information in the corresponding fields of the processed record. In this manner, changes to parent configuration items that impact navigational fields of their children records are populated downstream to all records in the hierarchy.

Still referring to FIG. 9, at block 918 a determination is made as to whether there is a missing downstream relationship for any of the records. Certain CI records are required to have a downstream physical relationship to another CI record of the appropriate type. Batch process 900 will validate that the required downstream relationships are present. If a required relationship is missing, the error flag is again set for that item at block 914. Assuming there are no missing downstream relationships missing at block 918, processing proceeds to block 920 where a determination is made as to whether an owner field is populated with a valid person or organization within the enterprise. This check may include for example, verification that a person listed is still employed by the enterprise and working in the appropriate capacity. Again, if a record is missing an owner at block 920, processing proceeds to setting of the error flag at block 914. Otherwise processing proceeds to block 922 where determination is made as to whether the appropriate information for reviewing the configuration change is populated within the record. This information is related to whom within the enterprise reviews and finally authorizes the configuration change. For example, it may be one or more of a change advisory board, a certain level of management, an IT director, etc. If the information is not populated, the system can populate it at block 924. Finally, at block 926, any final reporting as a result of the batch process is carried out, including issuing any error reports, reports to individuals or organizations that eventually need to approve the configuration change, etc.

As previously discussed with respect to FIG. 1, once change requests are validated and pending changes are documented in the change and/or configuration database, an enterprise will typically develop an appropriate change plan. Configuration and change management systems according to embodiments of the invention can document appropriate change plans as well as track the change approval process. For example, the change database can be updated to include a change design, a back-out plan, an implementation plan, a schedule, a communications plan, and a certification plan. Appropriate approvals can be collected and recorded, for example, from a security organization and a quality assurance (QA) organization. The status of a change request within a change database can reflect approvals or rejections by various approving groups. Note that in example embodiments of the invention discussed herein, a risk assessment and assignment of risk and impact values as discussed later with respect to FIGS. 13 through 15, can be accomplished as part of the planning process. Alternatively, these values can be assigned during the analysis phase, or assigned during the planning phase and updated during the analysis phase. An emergency change plan can be put in place in a similar fashion, with appropriate approvals and exceptions documented in a change database. In many circumstances, an emergency change process would bypass steps in change planning, validation, and approval. Thus, an appropriate justification may need to be supplied, and this can also be documented in the change database. It may also be necessary to obtain enterprise management approval and/or verification, which can of course also be appropriately documented.

Figure 10A:
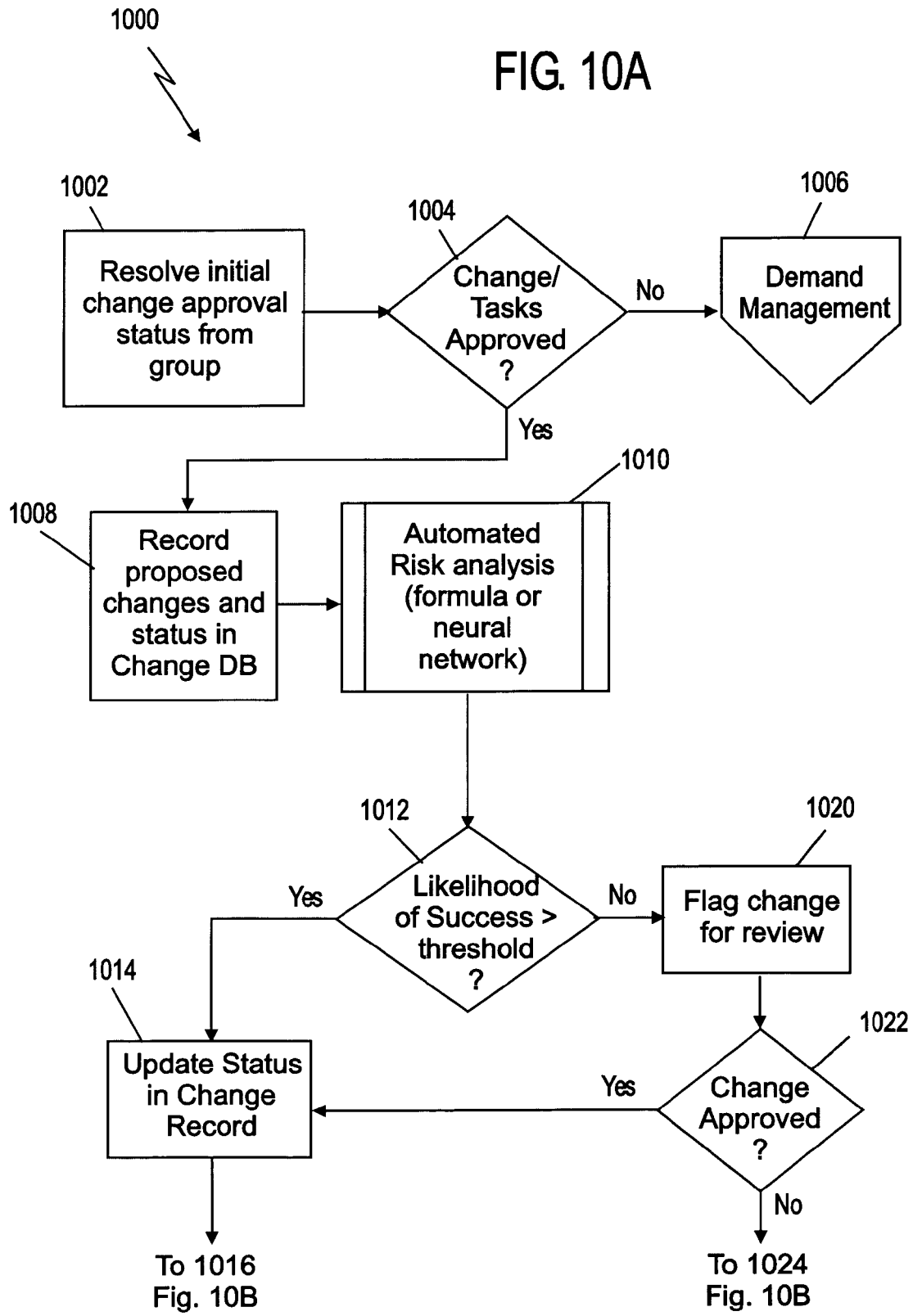
Figure 10B:
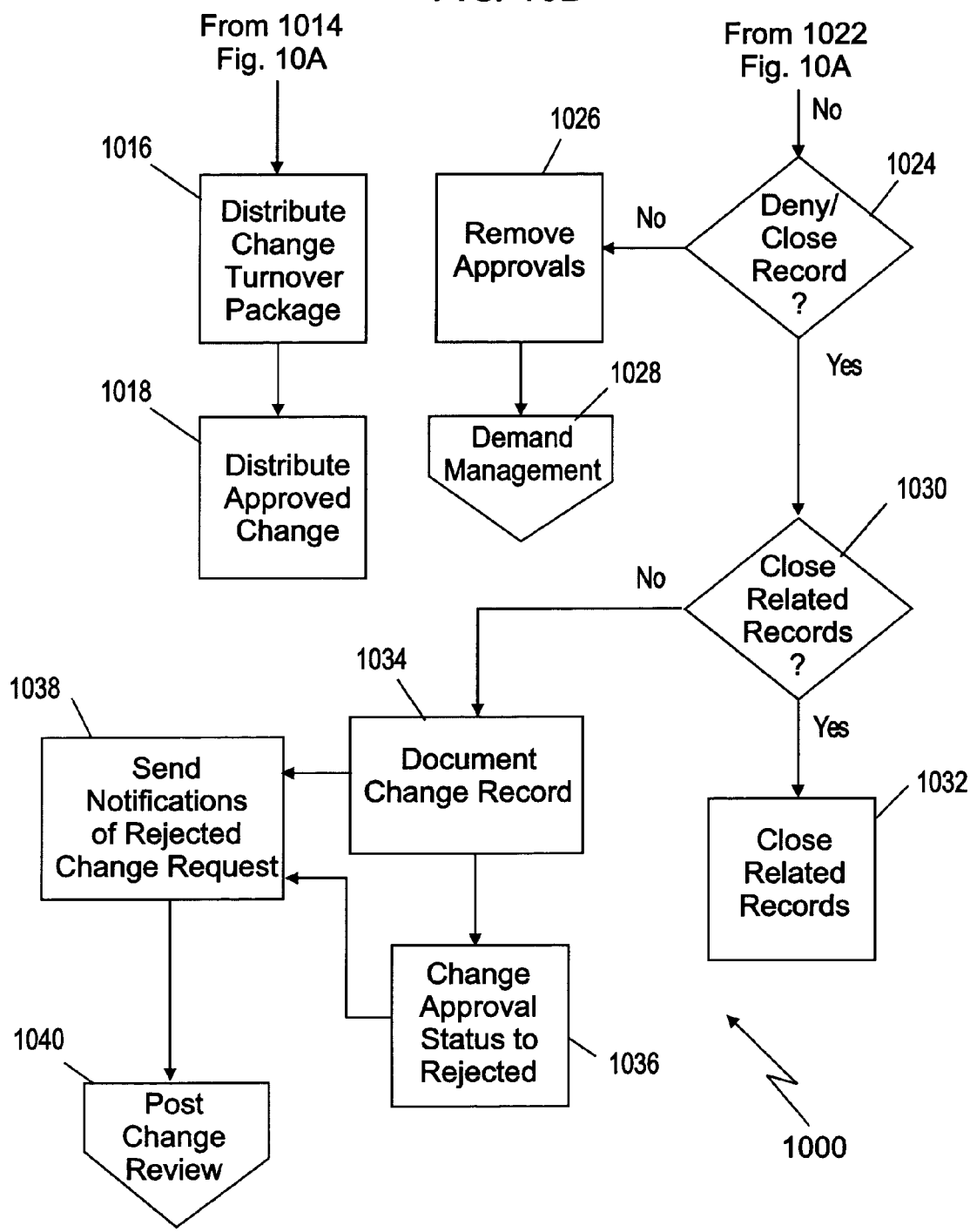

Once configuration update plans are in place for an enterprise, proposed changes can be analyzed and this analysis can also be appropriately documented. In some embodiments, this analysis may include the assignment of risk and impact values based on team reviews, assessments by change coordinators, management, etc. As a result of this analysis, the stored master change calendar may be updated or modified. Once an appropriate analysis is complete, a change plan goes through an approval process. As part of the approval process, the risk and/or impact of changes can be determined in an automated or a semi-automated fashion. Risk and impact evaluation is discussed in detail with respect to FIGS. 13-15 of the present description. FIG. 10 illustrates an example embodiment of an approval process that may make use of a an automated risk calculation technique, and details of how to carry out such an automated technique are discussed later with respect to FIGS. 14 and 15.

Process 1000 of FIG. 10 begins at block 1002, where the initial change approval status is received from the appropriate analysis group or groups. At block 1004, a check is made of that status to determine whether changes have been approved. If not, the process branches to demand management at block 1006, where the change request and definition can be revisited. Otherwise, at block 1008 the proposed changes and their status are recorded in the change database. Sub-process 1010 involves an automated risk analysis using either a risk calculation formula or a neural network as described later. With such a process, a likelihood of success threshold is typically set for the automated risk evaluation process. If the likelihood of success threshold is met at block 1012, processing proceeds to block 1014 where the status is updated in the appropriate change record in the change database. At block 1016 a turnover package to implement the change is distributed, and at block 1018 the change itself is distributed. The change can be distributed by forwarding an approved and validated change plan with all associated documentation to the appropriate stakeholders, fulfillment teams, etc. The existence of the documentation can also be recorded in the configuration management database and the change database.

Still referring to FIG. 10, if the automated risk analysis sub-process produces a likelihood of success below the assigned threshold at block 1012, the change is flagged for further review at block 1020. If the change is approved as a result of this review at block 1022, the status is again updated at block 1014. Otherwise, a decision is made at block 1024 as to whether the record is to be closed or denied. If not, approvals are removed at block 1026, and the process again branches to demand management at block 1028. Otherwise, a decision as to whether all related records are to be closed is made at block 1030. If so, the records are closed at block 1032. Otherwise the change record is documented at block 1034, and the approval status is changed to "rejected" at block 1036. These events are all documented in the appropriate databases. Finally, notifications of the rejected change requests are generated and sent at block 1038, and a post change review can be initiated at block 1040 to determine what went wrong with the change processing.

Once the analysis and approval phases are complete, in a typical enterprise, the change release is managed, and the change is implemented. Often a change coordinator is assigned, and that assignment is reflected in the appropriate databases. The change calendar is monitored and milestones are communicated. Notifications of the implementation and schedule are sent to the appropriate resources, stakeholders, and whatever organization owns the configuration change. Appropriate notifications and plans are noted in the change database. To implement the change, change activities are coordinated by the appropriate personnel. When a change is successful, management can review information provided in documents and integrate that data into the change documentation. Change records can be used to actually make the changes. The status of a change request can be updated to reflect the current status. However, in example embodiments, the change request may not be marked closed until both the change is completed and a post change review is performed. If a change is unsuccessful, it can be backed out using the change management process, with the normal impact and risk analysis possibly dictating adjustments to the change back-out plan as required. However, if the change was successful, the change can be finally registered with the configuration database as described with respect to FIG. 11.

Figure 11A:
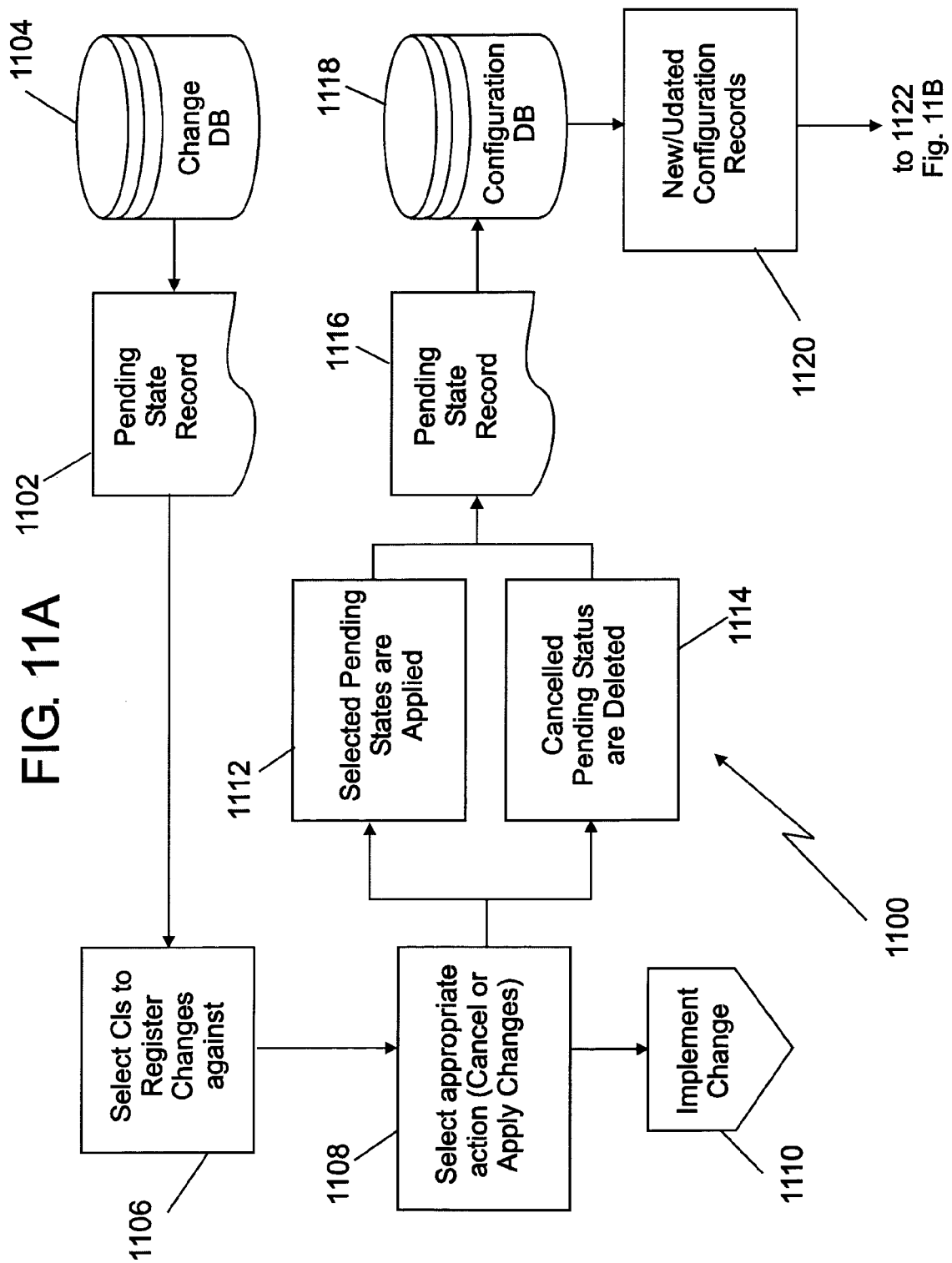
Figure 11B:
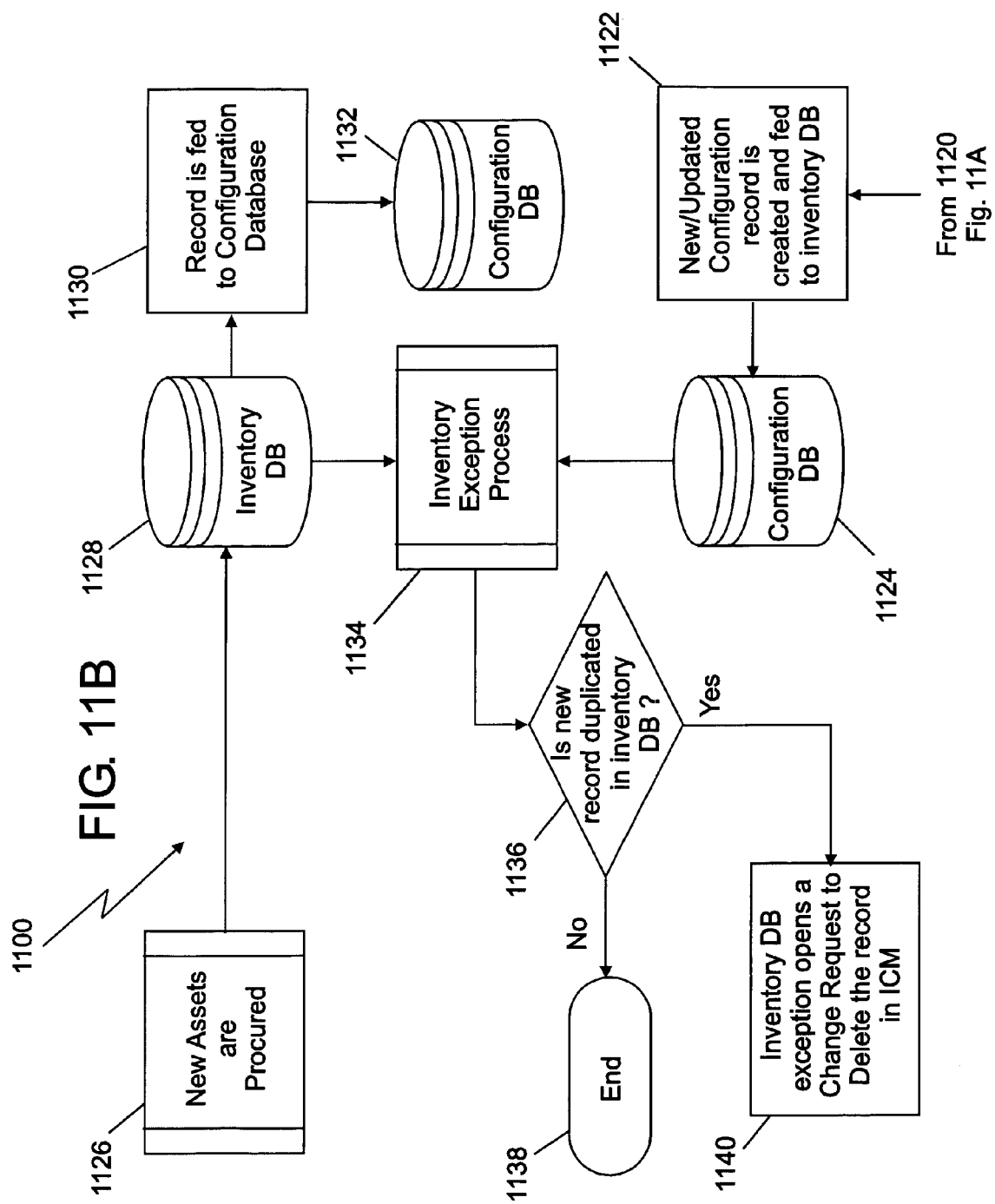

In process 1100 of FIG. 11, pending state records 1102 are accessed from change database 1104. At block 1106, configuration items are presented to a user so that they can be registered in the configuration database. At block 1108, provision is made to either have the changes applied or cancelled. Changes are then implemented to the configuration items in the database at block 1110. Selected pending states are applied to the pending state information in the database at block 1112 and selected cancelled pending states are deleted from the pending state information in the database at block 114. Pending state records 1116 are then updated in configuration database 1118. At block 1120 new and updated configuration records are generated within the configuration database system.

Still referring to FIG. 11, at block 1122 in at least some embodiments, the updated configuration items are fed to an asset control center to ensure that asset acquisition processes are kept in sync with the configuration change process. These events are documented back to the configuration database at block 1124. In parallel with this process, a procurement sub-process, 1126, updates the inventory database at block 1128 to account for new assets which were procured to implement any changes. In turn, new inventory information 1130 is fed to the configuration database at block 1132 so that the configuration database accurately reflects the current inventory. Note that an inventory exception sub-process, 1134, can be invoked by either the inventory database or the configuration database. This exception process can identify assets or configuration items that have not been appropriately updated in the configuration database. As part of this exception process, a determination is made at block 1136 as to whether a new inventory record is duplicated in the inventory database of the enterprise. If not, the process can end at block 1138. If so, an inventory database exception process can open a change request to delete the duplicate records by updating, deleting, or changing appropriate configuration items in the database. This exception process is opened at block 1140 of process 1100 of FIG. 11.

With at least some embodiments of the invention, a specific, CI exception process can be triggered in any of the sub-processes that involve updating, adding, deleting, or registering configuration items. The CI exception process can be applied to a CI in some cases if no parent record is found, if there is a delete, if changing reviewers, if changing status from inactive or retired, or if a new CI is to be assigned to a reviewer or review board. An exception review individual or entity can investigate duplicate configuration items, problems with relationships within the database, and the like. Databases can be updated and/or corrected accordingly. A determination can also be made as to whether the inventory database needs to be updated.

Figure 12:
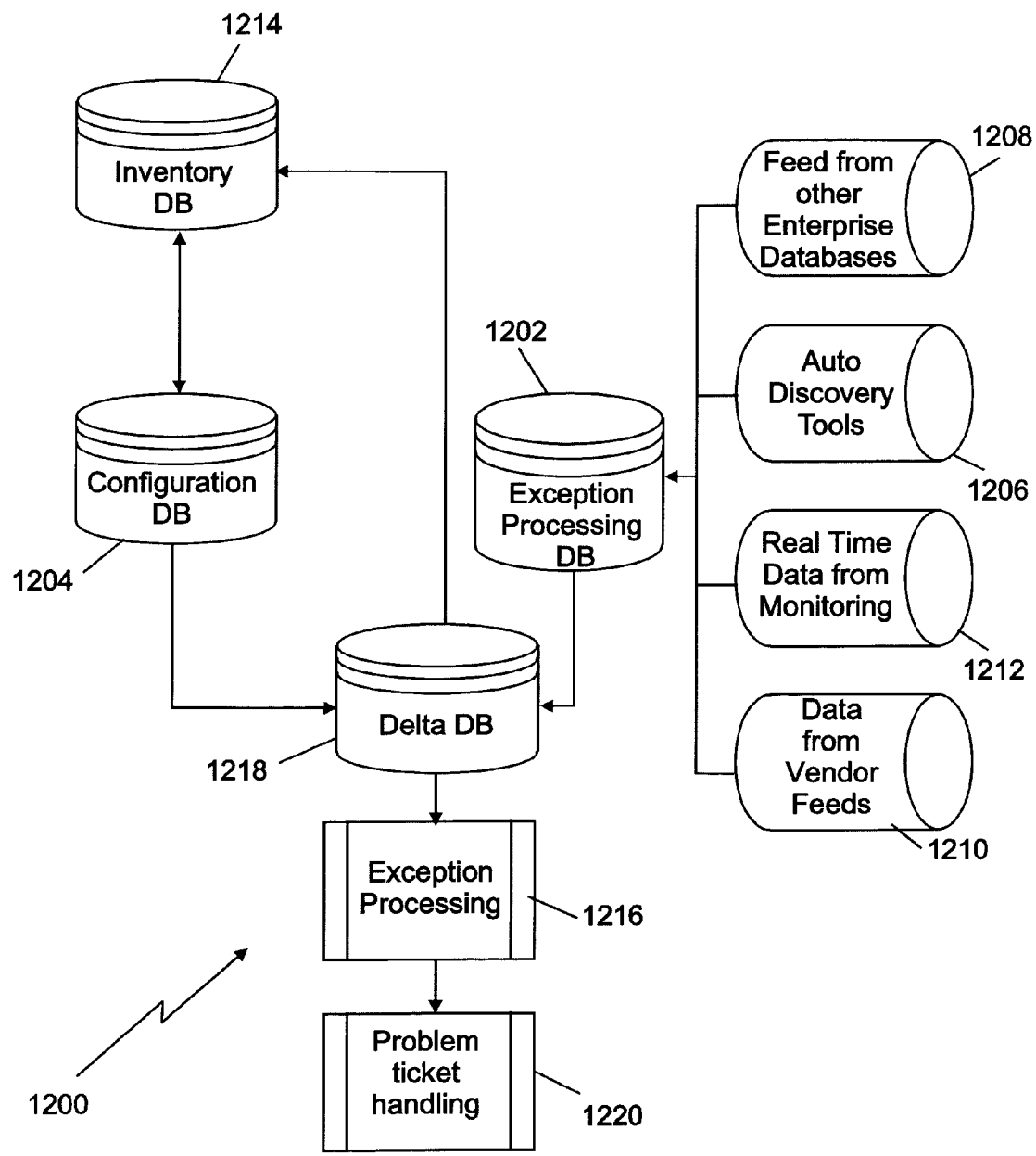
FIG. 12 is a system diagram illustrating automated exception processing according to some embodiments of the invention.

Once the configuration database has been updated for a successful change, any remaining exceptions need to be handled. Embodiments of the invention can include automated exception processing for this purpose. This automated exception processing is more general in nature than the CI exception processing discussed above, but may include the CI exception processing. FIG. 12 illustrates an example embodiment of automated exception processing. Portion 1200 of a system according to example embodiments of the invention can include an exception processing database, 1202, which can be added to mirror the structure found in the configuration database, 1204. All records found in the configuration database can be duplicated in the exception processing database, but all attributes may not be initially populated. Data from automated discovery tools 1206, feeds from other databases 1208, feeds from vendors 1210, and feeds from real-time monitoring teams 1212 can be used to populate the exception processing database. Inventory exceptions can be sent directly to the inventory database, 1214 for processing. In at least some embodiments the actual updates to the inventory database are not made until the exceptions are processed through the problem and change management processes.

An automated exception processing routine, 1216 of FIG. 12, performs a delta comparison between the data contained in the configuration database and the data populated in the exception processing database. Exceptions can be captured in a delta database, 1218, for processing. Records with the CI error flag set can be ignored. Captured deltas are processed, including a systematic review of CI pending states to validate that the corrections are not already being addressed. Problem management tickets can be automatically generated including the CI Records in error, the information included in the configuration database, the information included in the exception processing database and information about the CI owner.

Still referring to FIG. 12, problem handling process 1220 can monitor generated problem tickets. The problem management process can be engaged to determine the root cause(s) of the configuration error. Such root causes, for example, could include un-authorized changes, changes not being properly documented, changes not closed or pending states not applied, technical errors, and the like. Problem management can create or delegate the creation of change requests to correct the configuration errors in both the configuration database and any affected IT environments. The change management process can be used to manage the change requests through completion, as already described. Once the changes are executed and closed, the configuration database updates are registered as already described.

As previously mentioned, an enterprise employing embodiments of the invention described herein may wish to implement at post-change review process in addition to the automated exception handling process described immediately above. Personnel from within the enterprise can attend scheduled meetings to review all aspects of the change including, but not limited to technical and procedural merit and consistency, security issues, documentation, reuse potential, issue resolution, any risk discovered, etc. Change documents can be made easily accessible through the change database previously discussed, so that they can be reviewed for lessons learned, and best practices. Root cause analysis could begin with the post change review and be carried on throughout the enterprise. Patterns and trends may be distinguished both for root cause analysis, and for ongoing improvements to the change process. Trending can be done on all changes. Unsuccessful changes can be reviewed to mitigate the cause and risk of the failure. Successful changes can be trended to reuse the successful methodologies displayed, for example, any procedures that enhanced the process, reduced the cost, or expedited the scheduling. In addition, stored reference information such as system-assigned risk and impact values and change checklists can be corrected and updated.

Figure 13:
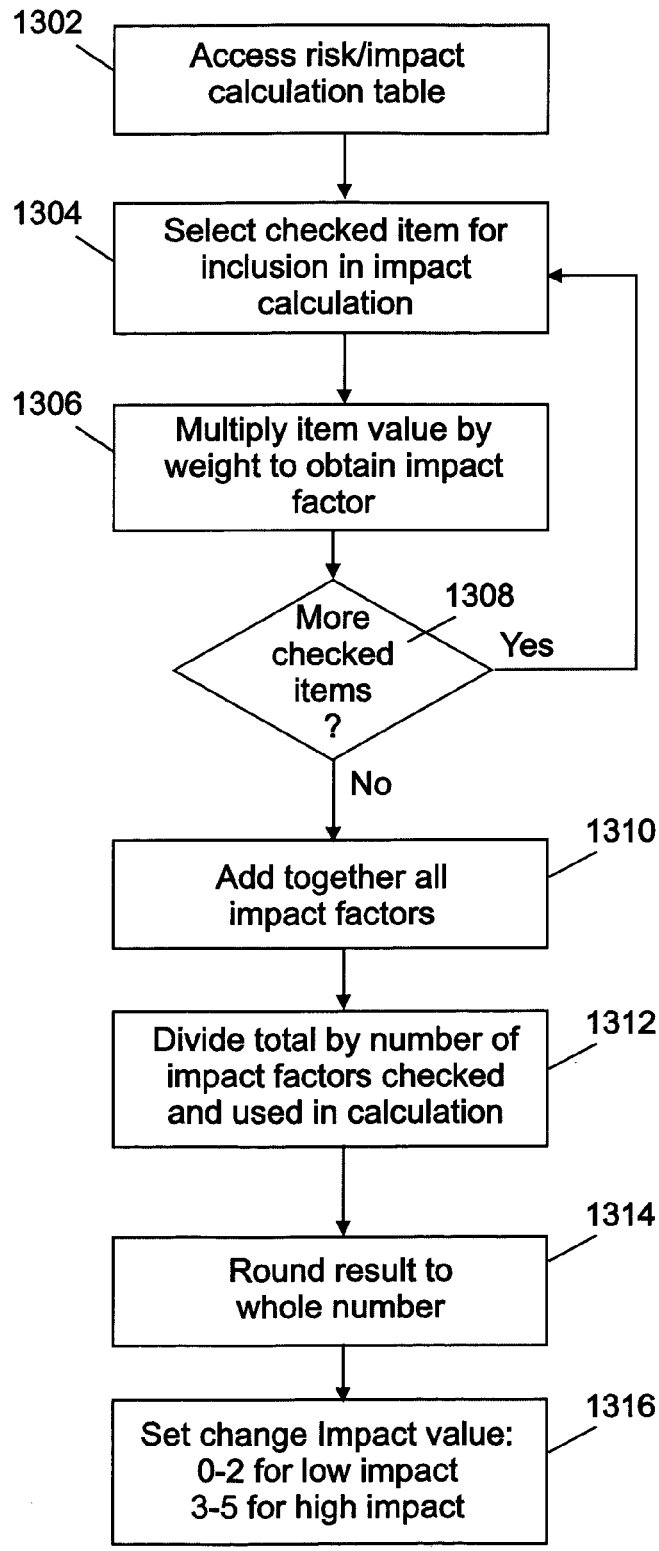
Figure 14:
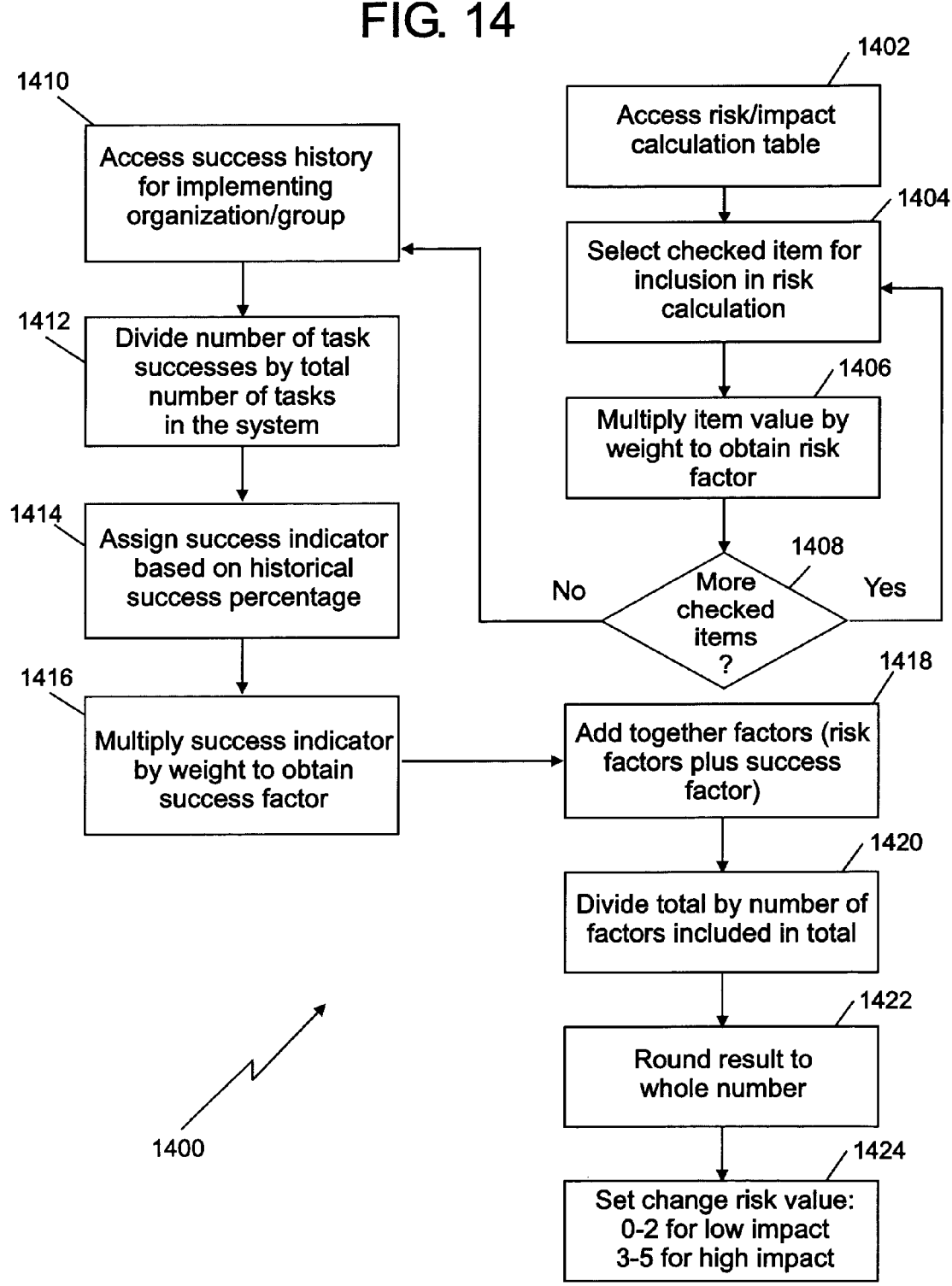

FIG. 13 illustrates an automated impact calculation that can be done by the system as part of the change management process in some embodiments. FIGS. 14 and 15 illustrate two alternative embodiments of an automated risk calculation that can be done as part the change management process. In at least some embodiments, impact and risk calculations are done in parallel; however they are illustrated separately here for clarity. It should be noted that a third embodiment of the risk calculation process would be identical to the impact calculation shown in FIG. 13, but stored values used would be risk values. Turning to FIG. 13, impact calculation process 1300 begins with the accessing of a stored table of risk (and impact) value fields at block 1302. Some of these values are assigned in the system based on the experience of IT or management personnel. A user accessing change management tools through the portal can also assign their own values for the risk and impact, but once the record is saved, the system does a calculation taking into account the stored field values. There are built in weights for these fields that allow calculation of risk and/or impact via a matrix table with weight values from 1 (low) to 5 (high).

For impact calculations (and risk calculations using a process like the process of FIG. 13) fields are re-calculated each time a change request is saved using the values in the stored table. The numeric result of dividing the sum of the impact factors allows for the appropriate equation to be determined, and then captured. An impact factor is derived by multiplying the numeric value of a field by its weight. A value and weight are included in the calculation as the system loops through the fields selected for inclusion multiplying their numeric value from the table of change fields by the weight specified in the table. The fields that either a user, or in some embodiments, the system administrators wish to be included are indicated in the stored table, for example, with check boxes.

At block 1304 of FIG. 13, if a field has the checkbox checked in the table, it is to be included in the calculations, and the weighted impact factor calculation is done for that item. In addition to both a user and system assigned overall impact, other impact values can correspond, for example, to the number of configuration items involved in the change. At block 1306 of FIG. 13, the field value for a field is multiplied by the weight to get a total value. At block 1308 the process branches so that the calculation is done again for the next value checked in the table. When the calculation of impact factors is finished, all factors are added together at block 1310. The total is divided by the number of factors used in the calculation to get an average impact at block 1312. The result is rounded to the nearest whole number at block 1314, and a change impact value is produced at block 1316. In example embodiments, this impact is considered low if the value is 0-2, and high if the impact value is 3-5. An embodiment of a risk calculation method like the impact calculation method of FIG. 13 would calculate risk the same way, but the stored values would be risk values, the weighted factors would be risk factors, and the value produced at the end would be a high or low risk value. Again, risk and impact calculations according to this process can be carried out in parallel, and one stored table can be used to store values and weights for both.

FIG. 14 illustrates one embodiment of a process, 1400, of risk calculation that takes into account the change history for an organization within the enterprise that is responsible for a change. The first four sub-process blocks of FIG. 14 are similar to the first four blocks of FIG. 13. Process 1400 begins with the accessing of a stored table of risk (and impact) value fields at block 1402. At block 1404 of FIG. 14, if a field has the checkbox checked in the table, it is to be included in the calculations, and the weighted risk factor calculation is done for that item. At block 1406 of FIG. 14, the field value for a field is multiplied by the weight to get a total value. At block 1408 the process branches so that the calculation is done again for the next value checked in the table.

Still referring to FIG. 14, at block 1410, once all the other risk factors are calculated, the success history for changes previously implemented by the group, individual, or organization within the enterprise is accessed. This success history can be stored in a database, for example, the problem database or the change database. At block 1412, the number of change task successes is divided by the total number of previous change tasks assigned to the selected group to obtain a success percentage. At 1414, a success indicator is produced for this change based on that success percentage. In example embodiments, this indicator is 5 for success percentages below 60%, 4 for success percentages of 60% up to 70%, 3 for success percentages of 70% up to 80%, 2 for success percentages of 80% up to 90%, and 1 for success percentages of 90% and above. At 1416, the success indicator is multiplied by a weight to get a weighted success factor similar to the other risk factors, and this weighted success factor becomes another factor included in the risk calculation. In example embodiments, a weight of 3 is used.

The remainder of process 1400 of FIG. 14 is similar to the impact calculation process illustrated in FIG. 13. All factors are added together at block 1418. The total is divided by the number of factors used in the calculation to get an average at block 1420. The result is rounded to the nearest whole number at block 1422, to produce an overall risk value at block 1424. In example embodiments, this risk is considered low if the value is 0-2, and high if the value is 3-5.

FIG. 15 illustrates another way that a risk calculation can be done in a change management process according to an example embodiment of the invention. Process 1500 of FIG. 4 uses a neural network to determine risk. To initialize the neural network, a fitness test is run on the historical data in the change and configuration management databases at sub-process block 1502. A fitness test for a neural network is an algorithm that measures the correlation of all of the available data fields to a particular data field of interest. In the example embodiments of the invention, the field of interest indicates whether or not a historic change passed or failed. Once the fitness test is completed, a training routine is performed at block 1504 that teaches the neural network to recognize patterns in the fields that correlate to the desired information of a change passing or failing. The trained neural network can be saved at block 1506 and new data can be analyzed using the pattern recognition capabilities learned by the neural network.

Still referring to FIG. 15, the trained neural network, when invoked to evaluate a change at block 1508, analyzes change history with respect to corresponding configuration data for recognizable patterns that correlate to successful or un-successful changes. The neural network then compares the patterns to detailed information about change requests that are pending approval at block 1510. This comparison can take into account the change calendar and the stored sensitivity dates to evaluate the risk. A probability of successful change installation is assigned at block 1512 based on the result. The assigned probability will be used to either programmatically approve changes without the need of an approving body or trigger additional analysis for changes that yield a high probability of failure. The percentage chance of success that is used to trigger automatically approval can be set at a higher level, for example, 80%, during the early stages of using the neural network algorithm, and either left at that percentage, or perhaps decreased as the algorithm becomes more accurate. Since the effectiveness of neural networks increases over time, the percentage of failed changes will still continue to decrease and the system's ability to catch high-risk changes in advance will increase.

Specific embodiments of an invention are described herein. One of ordinary skill in the computing, networking, and information technology arts will quickly recognize that the invention has other applications and other environments. In fact, many embodiments and implementations are possible. The following claims are in no way intended to limit the scope of the invention to the specific embodiments described above.

What is claimed is:

1. A method of managing a configuration of resources in an enterprise, the method comprising:
    defining, through the use of a processor operatively coupled to a configuration database, a proposed configuration change for at least one information technology (IT) resource in a plurality of IT resources,
    wherein the configuration database stores historical, current, and scheduled future configurations of the plurality of IT resources defined in terms of configuration items for the plurality of IT resources, such that the historical, current, and future configurations of the plurality of IT resources can be accessed for any given point in time,
    wherein the configuration database further stores links between configuration items of the plurality of IT resources that are linked together through upstream, downstream, or peer relationships organized according to a dimensional model;
    wherein the proposed configuration change to the at least one IT resource is defined in terms of the configuration items for the at least one IT resource and comprises at least one proposed new, updated, or deleted configuration item for the at least one IT resource, and proposed links with configuration items for at least a second IT resources of the plurality of IT resources within the enterprise;
    determining, through the use of a processor, a likelihood of success of the proposed configuration change by performing an automatic risk analysis of the proposed configuration change,
    wherein the automatic risk analysis compares the configuration items of the proposed configuration change for the at least one IT resource with the success of the historical configurations for the plurality of IT resources that have similar configuration items, the success of the current configurations for the plurality of IT resources that have similar configuration items, and the scheduled future configurations for the plurality of IT resources that have similar configuration items; and further compares the proposed links of the at least one IT resource with the links to the configuration items of the current configurations and the scheduled future configurations of the plurality of IT resources; and wherein the likelihood of success of the proposed configuration change increases based on the collective success of the historical configurations that have similar configuration items and the current configurations that have similar configuration items, and as the number of scheduled future configurations that have similar configuration items increases;
    releasing, through the use of the processor, the proposed configuration change when the likelihood of success of the proposed configuration change meets a threshold value and submitting the proposed configuration change for further evaluation when the likelihood of success of the proposed configuration change does not meet the threshold value; and
    registering, through the use of the processor, the configuration items of the proposed configuration change in the configuration database when the proposed configuration change is released so that the configuration database maintains the current configurations of the plurality of IT resources, maintains the linked relationship of the configuration items, and can be used to determine the likelihood of success of future proposed configuration changes.

2. The method of claim 1 wherein the configuration change is defined by reference to a specified configuration item (CI) record, and wherein the method further comprises validating the specified CI record with respect to a link to at least one of an upstream CI record, a downstream CI record, a peer CI record and a view.

3. The method of claim 2 wherein at least one CI record is selected from a group consisting of a midrange computer CI record, a midrange partition CI record, a mainframe computer CI record, a logical partition (LPAR) CI record, a software CI record, a software component CI record, and combinations of the foregoing.

4. The method of claim 2 wherein at least one CI record is selected from a group consisting of a service CI record, a delivery channel CI record, an application CI record, a subsystem CI record, a hardware CI record, a physical location CI record, and combinations of the foregoing.

5. The method of claim 4 further comprising accessing an inventory database to obtain information about resources related to the configuration change.

6. The method of claim 1 further comprising accessing an inventory database to obtain information about resources related to the configuration change and wherein the configuration change is defined by reference to a specified configuration item (CI) record, and wherein the method further comprises validating the specified CI record with respect to a link to at least one of an upstream CI record, a downstream CI record, a peer CI record and a view.

7. The method of claim 1 wherein the configuration change is defined by reference to a specified configuration item (CI) record and wherein at least one CI record is selected from a group consisting of a midrange computer CI record, a midrange partition CI record, a mainframe computer CI record, a logical partition (LPAR) CI record, a software CI record, a software component CI record, and combinations of the foregoing, the method further comprising:

accessing an inventory database to obtain information about resources related to the configuration change; and validating the specified CI record with respect to a link to at least one of an upstream CI record, a downstream CI record, a peer CI record and a view.

8. The method of claim 1 further comprising accessing an inventory database to obtain information about resources related to the configuration change.

9. The method of claim 1 wherein the registering of the configuration change further comprises updating the configuration database based on the contents of a change database, wherein the change database maintains a record of configuration changes.

10. The method of claim 1 wherein the registering of the configuration change further comprises updating the configuration database based on the contents of a change database, wherein the change database maintains a record of configuration changes and wherein the configuration change is defined by reference to a specified configuration item (CI) record, and wherein the method further comprises validating the specified CI record with respect to a link to at least one of an upstream CI record, a downstream CI record, a peer CI record and a view.

11. The method of claim 1 further comprising accessing an inventory database to obtain information about resources related to the configuration change and wherein the registering of the configuration change further comprises updating the configuration database based on the contents of a change database, wherein the change database maintains a record of configuration changes.

12. The method of claim 1, wherein reverting to the historical configuration comprises reverting from a current configuration of the one or more IT resources to a previous configuration of the one or more IT resources when the current configuration is not functioning properly.

13. The method of claim 1, wherein the one or more IT resources is a first set of IT resources; and wherein implementing the current configuration of the first set of one or more IT resources comprises configuring a second set of one or more IP resources with the current configuration of the first set of one or more IT resources when the current configuration of the first set of one or more IT resources is functioning properly.

14. The method of claim 1, wherein scheduling the future configuration of the one or more IT resources comprises scheduling a configuration change for the one or more IT resources based on a likelihood of success of implementation of the configuration change.

15. A non-transitory computer readable storage medium storing a computer program product for managing a configuration of resources in an enterprise, the computer program product comprising computer program code, the computer program code further comprising:

instructions for defining a proposed configuration change for at least one information technology (IT) resource in a plurality of IT resources, wherein a configuration databased is used to store historical, current, and scheduled future configurations of the plurality of IT resources defined in terms of configuration items for the plurality of IT resources, such that the historical, current, and future configurations of the plurality of IT resources can be accessed for any given point in time, resources, or scheduling a new configuration of the one or more IT resources, and wherein the configuration database further comprises a plurality of configuration item records organized according to a dimensional model and describing the configuration of the IT resources in the enterprise;

wherein the configuration database further stores links between configuration items of the plurality of IT resources that are linked together through upstream, downstream, or peer relationships organized according to a dimensional model;

wherein the proposed configuration change to the at least one IT resource is defined in terms of the configuration items for the at least one IT resource and comprises at least one proposed new, updated, or deleted configuration item for the at least one IT resource, and proposed links with configuration items for at least a second IT resources of the plurality of IT resources within the enterprise;

instructions for determining a likelihood of success of the proposed configuration change by performing an automatic risk analysis of the proposed configuration change, wherein the automatic risk analysis compares the configuration items of the proposed configuration change for the at least one IT resource with the success of the historical configurations for the plurality of IT resources that have similar configuration items, the success of the current configurations for the plurality of IT resources that have similar configuration items, and the scheduled future configurations that have similar configuration items; and further compares the proposed links of the at least one IT resource with the links to the configuration items of the current configurations and the scheduled future configurations of the plurality of IT resources, and wherein the likelihood of success of the proposed configuration change increases based on the collective success of the historical configurations that have similar configuration items and the current configurations that have similar configuration items, and as the number of scheduled future configurations that have similar configuration items increases;

instructions for releasing the proposed configuration change when the likelihood of success of the proposed configuration change meets a threshold value and submitting the proposed configuration change for further evaluation when the likelihood of success of the proposed configuration change does not meet the threshold value; and instructions for registering the configuration items of the proposed configuration change in the configuration database when the proposed configuration change is released so that the configuration database maintains the current configurations of the plurality of IT resources, maintains the linked relationship of the configuration items, and can be used to determine the likelihood of success of future proposed configuration changes.

16. The non-transitory computer readable storage medium of claim 15 wherein the configuration change is defined by reference to a specified configuration item (CI) record, and wherein the method further comprises validating the specified CI record with respect to a link to at least one of an upstream CI record, a downstream CI record, a peer CI record, and a view.

17. The non-transitory computer readable storage medium of claim 16 wherein at least one CI is selected from a group consisting of a midrange computer CI record, a midrange partition CI record, a mainframe computer CI record, a logical partition (LPAR) CI record, a software CI record, a software component CI record, and combinations of the foregoing.

18. The non-transitory computer readable storage medium of claim 16 wherein at least one CI record is selected from a group consisting of a service CI record, a delivery channel CI record, an application CI record, a sub-system CI record, a hardware CI record, a physical location CI record, and combinations of the foregoing.

19. The non-transitory computer readable storage medium of claim 15 wherein the computer program code further comprises instructions for accessing an inventory database to obtain information about resources related to the configuration change.

20. The non-transitory computer readable storage medium of claim 15 wherein the configuration change is defined by reference to a specified configuration item (CI) record and wherein the computer program code further comprises:
   instructions for accessing an inventory database to obtain information about resources related to the configuration change; and
   instructions for validating the specified CI record with respect to a link to at least one of an upstream CI record, a downstream CI record, a peer CI record, and a view.

21. The non-transitory computer readable storage medium of claim 15 wherein the computer program code further comprises instructions for accessing an inventory database to obtain information about resources related to the configuration change, and wherein the configuration change is defined by reference to a specified configuration item (CI) record, and wherein the method further comprises validating the specified CI record with respect to a link to at least one of an upstream CI record, a downstream CI record, a peer CI record, and a view, and at least one CI record is selected from a group consisting of a midrange computer CI record, a midrange partition CI record, a mainframe computer CI record, a logical partition (LPAR) CI record, a software CI record, a software component CI record, and combinations of the foregoing.

22. The non-transitory computer readable storage medium of claim 18 wherein the computer program code further comprises instructions for accessing an inventory database to obtain information about resources related to the configuration change.

23. The non-transitory computer readable storage medium of claim 15 wherein the computer program code further comprises instructions for updating the configuration database based on the contents of a change database, wherein the change database maintains a record of configuration changes.

24. The non-transitory computer readable storage medium of claim 16 wherein the computer program code further comprises instructions for updating the configuration database based on the contents of a change database, wherein the change database maintains a record of configuration changes.

25. The non-transitory computer readable storage medium of claim 17 wherein the computer program code further comprises instructions for updating the configuration database based on the contents of a change database, wherein the change database maintains a record of configuration changes.

26. The non-transitory computer readable storage medium of claim 18 wherein the computer program code further comprises instructions for updating the configuration database based on the contents of a change database, wherein the change database maintains a record of configuration changes.

27. The computer program product of claim 15, wherein reverting to the historical configuration comprises reverting from a current configuration of the one or more IT resources to a previous configuration of the one or more IT resources when the current configuration is not functioning properly.

28. The computer program product of claim 15, wherein the one or more IT resources is a first set of IT resources; and wherein implementing the current configuration of the first set of one or more IT resources comprises configuring a second set of one or more IP resources with the current configuration of the first set of one or more IT resources when the current configuration of the first set of one or more IT resources is functioning properly.

29. The computer program product of claim 15, wherein scheduling the future configuration of the one or more IT resources comprises scheduling a configuration change for the one or more IT resources based on a likelihood of success of implementation of the configuration change.

30. Apparatus for managing the configuration of resources in an enterprise, the apparatus comprising:
   means for defining a proposed configuration change for at least one information technology (IT) resource in a plurality of IT resources,
   wherein the configuration database stores historical, current, and scheduled future configurations of the plurality of IT resources defined in terms of configuration items for the plurality of IT resources, such that the historical, current, and future configurations of the plurality of IT resources can be accessed for any given point in time,
   wherein the configuration database further stores links between configuration items of the plurality of IT resources that are linked together through upstream, downstream, or peer relationships organized according to a dimensional model;
   wherein the proposed configuration change to the at least one IT resource is defined in terms of the configuration items for the at least one IT resource and comprises at least one proposed new, updated, or deleted configuration item for the at least one IT resource, and proposed links with configuration items for at least a second IT resources of the plurality of IT resources within the enterprise;
   means for determining a likelihood of success of the proposed configuration change by performing an automatic risk analysis of the proposed configuration change,
   wherein the automatic risk analysis compares the configuration items of the proposed configuration change for the at least one IT resource with the success of the historical configurations for the plurality of IT resources that have similar configuration items, the success of the current configurations for the plurality of IT resources that have similar configuration items, and the scheduled future configurations for the plurality of IT resources that have similar configuration items; and further compares the proposed links of the at least one IT resource with the links to the configuration items of the current configurations and the scheduled future configurations of the plurality of IT resources, and wherein the likelihood of success of the proposed configuration change increases based on the collective success of the historical configurations that have similar configuration items and the current configurations that have similar configuration items, and as the number of scheduled future configurations that have similar configuration items increases;
   means for releasing the proposed configuration change when the likelihood of success of the proposed configuration change meets a threshold value and submitting the proposed configuration change for further evaluation when the likelihood of success of the proposed configuration change does not meet the threshold value; and means for registering the configuration items of the proposed configuration change in the configuration database when the proposed configuration change is released so that the configuration database maintains the current configurations of the plurality of IT resources, maintains the linked relationship of the configuration items, and can be used to determine the likelihood of success of future proposed configuration changes.

31. The apparatus of claim 30 further comprising means for accessing an inventory database to obtain information about resources related to the configuration change.

32. The apparatus of claim 31 further comprising means for updating the configuration database based on the contents of a change database, wherein the change database maintains a record of configuration changes.

33. The apparatus of claim 30 further comprising means for updating the configuration database based on the contents of a change database, wherein the change database maintains a record of configuration changes.

34. A system for managing the configuration of resources in an enterprise, the system comprising:
   a processor;
   a configuration database, operatively coupled to the processor, wherein the processor is configured for storing and retrieving information on the configuration database; and wherein the processor is configured to execute a computer-readable program code for:
   defining a proposed configuration change for at least one information technology (IT) resource in a plurality of IT resources,
   wherein the configuration database stores historical, current, and scheduled future configurations of the plurality of IT resources defined in terms of configuration items for the plurality of IT resources, such that the historical, current, and future configurations of the plurality of IT resources can be accessed for any given point in time,
   wherein the configuration database further stores links between configuration items of the plurality of IT resources that are linked together through upstream, downstream, or peer relationships organized according to a dimensional model;
   wherein the proposed configuration change to the at least one IT resource is defined in terms of the configuration items for the at least one IT resource and comprises at least one proposed new, updated, or deleted configuration item for the at least one IT resource, and proposed links with configuration items for at least a second IT resources of the plurality of IT resources within the enterprise;
   determining a likelihood of success of the proposed configuration change by performing an automatic risk analysis of the proposed configuration change,
   wherein the automatic risk analysis compares the configuration items of the proposed configuration change for the at least one IT resource with the success of the historical configurations for the plurality of IT resources that have similar configuration items, the success of the current configurations for the plurality of IT resources that have similar configuration items, and the scheduled future configurations for the plurality of IT resources that have similar configuration items; and further compares the proposed links of the at least one IT resource with the links to the configuration items of the current configurations and the scheduled future configurations of the plurality of IT resources, and wherein the likelihood of success of the proposed configuration change increases based on the collective success of the historical configurations that have similar configuration items and the current configurations that have similar configuration items, and as the number of scheduled future configurations that have similar configuration items increases;
   releasing the proposed configuration change when the likelihood of success of the proposed configuration change meets a threshold value and submitting the proposed configuration change for further evaluation when the likelihood of success of the proposed configuration change does not meet the threshold value, and
   registering the configuration items of the proposed configuration change in the configuration database when the proposed configuration change is released so that the configuration database maintains the current configurations of the plurality of IT resources, maintains the linked relationship of the configuration items, and can be used to determine the likelihood of success of future proposed configuration changes.

35. The system of claim 34 further comprising an inventory database operatively connected to the processor, wherein the processor is configured for providing updates to the configuration database to maintain currency based on inventory records.

36. The system of claim 35 further comprising a service level management subsystem operatively coupled to the processor, wherein the processor is configured for ensuring changes to the configuration database are consistent with at least one of service level agreements and operating level agreements.

37. The system of claim 35 further comprising at least one of an exception processing database and a problem database operatively coupled to the processor, wherein the processor is configured for tracking problems with configuration changes for analysis and management.

38. The system of claim 34 further comprising at least one of a problem database and an exception processing database operatively coupled to the processor, wherein the processor is configured for tracking problems with configuration changes for analysis and management.

39. The system of claim 34 further comprising a service level management system operatively coupled to the processor, wherein the processor is configured for ensuring changes to the configuration database are consistent with at least one of service level agreements and operating level agreements.

40. The system of claim 34 further comprising:
   at least one of a problem database and an exception processing database operatively coupled to the processor, wherein the processor is configured for tracking problems with configuration changes for analysis and management; and
   a service level management system operatively coupled to the processor, wherein the processor is configured for ensuring changes to the configuration database are consistent with at least one of service level agreements and operating level agreements.

* * * * *